(12) United States Patent
Begolo et al.

(10) Patent No.: US 12,546,790 B2
(45) Date of Patent: Feb. 10, 2026

(54) MICROSCOPE SLIDE PROCESSING SYSTEMS, CONSUMABLE STAINER MODULES, AND METHODS OF USING THE SAME

(71) Applicant: Ventana Medical Systems, Inc., Tucson, AZ (US)

(72) Inventors: Stefano Begolo, Rancho Dominguez, CA (US); Leanna M. Levine, Rancho Dominguez, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 538 days.

(21) Appl. No.: 17/151,041

(22) Filed: Jan. 15, 2021

(65) Prior Publication Data

US 2021/0172967 A1  Jun. 10, 2021

Related U.S. Application Data

(63) Continuation of application No. PCT/EP2019/068774, filed on Jul. 12, 2019.
(Continued)

(51) Int. Cl.
*G01N 1/31* (2006.01)
*G01N 35/00* (2006.01)

(52) U.S. Cl.
CPC ....... *G01N 35/00029* (2013.01); *G01N 1/312* (2013.01); *G01N 35/0092* (2013.01);
(Continued)

(58) Field of Classification Search
CPC .......... G01N 35/00029; G01N 35/028; G01N 35/021; G01N 35/025; G01N 35/026;
(Continued)

(56) References Cited

U.S. PATENT DOCUMENTS

| 6,849,457 B1 | 2/2005 | Babson et al. |
| 2002/0192701 A1 | 12/2002 | Adey |

(Continued)

FOREIGN PATENT DOCUMENTS

| WO | 2005016532 A2 | 2/2005 |
| WO | 2017081115 A1 | 5/2017 |

(Continued)

OTHER PUBLICATIONS

International Search Report and Written Opinion, mailed Nov. 20, 2019, in corresponding PCT/EP2019/068774, filed Jul. 12, 2019, pp. 1-18.
(Continued)

*Primary Examiner* — Elizabeth A Robinson
*Assistant Examiner* — Tingchen Shi
(74) *Attorney, Agent, or Firm* — Perkins Coie LLP

(57) ABSTRACT

Systems and methods that enable automated processing of specimens carried on microscope slides are described herein. Aspects of the technology are directed, for example, to automated specimen processing systems configured to use microfluidic slide processing modules to robotically process tissue specimens. The slide processing modules can include reagents and a flow cell with a reaction chamber for holding the tissue specimens and reagent.

30 Claims, 17 Drawing Sheets

Related U.S. Application Data

(60) Provisional application No. 62/698,786, filed on Jul. 16, 2018.

(52) U.S. Cl.
CPC ............... *G01N 35/0099* (2013.01); *G01N 2035/00138* (2013.01)

(58) Field of Classification Search
CPC ...... G01N 1/312; G01N 1/31; G01N 35/0092; G01N 35/00584; G01N 2035/00138; G01N 2035/00089
See application file for complete search history.

(56) References Cited

U.S. PATENT DOCUMENTS

| | | |
|---|---|---|
| 2012/0177543 A1 | 7/2012 | Battrell |
| 2015/0238959 A1* | 8/2015 | Prakash ................ G05B 19/14 506/7 |
| 2015/0298118 A1* | 10/2015 | Chard ...................... B01L 9/52 435/7.92 |
| 2017/0058245 A1* | 3/2017 | Shah ................... B01L 3/50273 |
| 2017/0328820 A1 | 11/2017 | Angros |
| 2018/0073963 A1 | 3/2018 | Kawano et al. |
| 2018/0193831 A1 | 7/2018 | Hopper |
| 2021/0172968 A1 | 6/2021 | Gaertner et al. |
| 2021/0172969 A1 | 6/2021 | O'Connor |

FOREIGN PATENT DOCUMENTS

| | | |
|---|---|---|
| WO | 2018001767 | 1/2018 |
| WO | 2020016113 | 1/2020 |
| WO | 2020016126 | 1/2020 |
| WO | 2020016127 | 1/2020 |

OTHER PUBLICATIONS

ISA: European Patent Office, PCT Application No. PCT/EP2019/68809, filed Jul. 12, 2019, International Search Report and Written Opinion: mailed: Mar. 19, 2020, 14 pages.

ISA: European Patent Office, PCT Application No. PCT/EP2019/068814, filed Jul. 12, 2019, International Search Report and Written Opinion mailed: Feb. 11, 2020, 23 pages.

* cited by examiner

MICROSCOPE SLIDE PROCESSING SYSTEMS, CONSUMABLE STAINER MODULES, AND METHODS OF USING THE SAME

CROSS-REFERENCE TO RELATED APPLICATIONS

This application is a continuation of PCT Application No. PCT/EP2019/068774, filed Jul. 12, 2019, which claims priority to U.S. Provisional Application No. 62/698,786, filed Jul. 16, 2018, which are hereby incorporated by reference in their entireties.

TECHNICAL FIELD

This disclosure relates to systems for preparing samples for analysis. In particular, the disclosure relates to automated slide processing systems, consumable stainer units, and related technologies for processing sample-bearing microscope slides.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are typically prepared for analysis by applying one or more liquids (e.g., reagents) to the specimens. If a specimen is treated with multiple liquids, both the application and subsequent removal of each liquid can be important for producing stained specimens suitable for analysis. For example, microscope slides bearing biological specimens, e.g., tissue sections or cells, are often treated with a series of manually applied reagents to add color and contrast to otherwise transparent or invisible cells or cell components. This labor-intensive process often results in inconsistent processing due to individual techniques among laboratory technicians.

Automated slide processing machines are often used for high-volume slide processing. Unfortunately, conventional automated slide processing machines are typically relatively large, thus making them unsuitable for use in surgery suites and small laboratories. For example, conventional automated pipetting systems can be quite large and have pipetting heads capable of individually dispensing liquids onto specimen-bearing microscope slides held by a tray. Pipettes are used to aspirate reagents out of bottles and to dispense the reagents onto uncovered slides. The reagents are exposed to air which can lead to degradation, e.g., due to oxidation, or biologic contamination of solution components over time. This can lead to inconsistent staining unless the solutions are regularly replenished or exchanged. Replenishing or exchanging liquids can be a time-consuming and wasteful process that often disrupts work-flow. Additionally, automated pipetting systems have a limited number of reagent bottles, thus limiting the number of staining protocols that can be performed or necessitating swapping which negatively impacts workflow. Accordingly, conventional automated slide processing machines suffer various drawbacks.

SUMMARY

At least some embodiments include a staining system for preparing and analyzing biological specimens. The staining system can include a consumable stainer unit for processing microscope slides bearing biological specimens with a series of robotically applied reagents to add color stains and background contrast to otherwise transparent or invisible cells or cell components. The stainer unit can include reagent dispensing elements, a slide processing station which can control temperature, reagent removal elements, and sealed reagent holders with reagents. The stainer unit can be integrated into an instrument in a laboratory environment. In some embodiments, the stainer unit can also include containers to capture used reagents for safe and convenient disposal. The stainer unit can contain the specimen slide and can prevent, limit, or minimize evaporative losses, stain degradation (e.g., due to oxidation), and minimize or eliminate the possibility of tissue cross-contamination, or other problems. Accordingly, the stainer unit can be used to control reagent characteristics (e.g., concentrations, mixtures, etc.) to enhance the effectiveness of the reagents, resulting in desired staining characteristics. In single use embodiments, the stainer unit can have enough reagent to perform a single multistep staining protocol to avoid reagent waste and can be made of relative low-cost materials. To process multiple slides, each slide can be processed with a consumable stainer unit selected from a family of consumables based on the reagents stored within them, and the staining protocol required. Manual procedures, automated procedures, or combinations of manual and automated procedures can be used to process the slides.

Aspects of the technology are directed, for example, to an automated staining system having a staining instrument with at least one end effector and consumable microfluidic slide processing module configured to be installed in the instrument. The instrument causes reagent to be delivered to a reaction chamber of the microfluidic slide processing module. The microfluidic slide processing module can include a plurality of reagent elements and a cell connected to the reagent elements. The cell includes a slide-receiving region dimensioned to receive a microscope slide and a cover having a gasket positioned to sealingly contact a specimen-bearing surface of the microscope slide to define a reaction chamber that is between the cover and the specimen-bearing. The reaction chamber can be completely surrounded by the gasket. When the microfluidic slide processing module is installed in the staining instrument, the staining instrument is operable to cause reagent from a reagent reservoir at a respective one of the reagent elements to be delivered to the reaction chamber.

The slide processing module can carry fresh reagents, waste material, and components used to handle the reagents. The slide processing module can be a single-use or multi-use unit. In some embodiments, all or some of the fresh reagent is delivered to the reaction chamber to process the specimen. In some procedures, all or some of the reagents contained in the slide processing module may be captured in a waste container integrated into the slide processing module. During processing, multiple aliquots of reagent can be delivered from the same reservoir to the reaction chamber. After completion of the specimen processing operations, a significant portion or most of the reagent, by volume, can be carried by the waste container. For example, at least 50%, 60%, 70%, 80%, 90%, 95%, or other percentage of the total volume of reagent, including fresh and used reagent, carried by the slide processing module can be contained in the waste container.

In some embodiments, a microfluidic slide processing module for processing slides includes a support base and a flow cell connected to the support base. The flow cell can include a slide engagement region having a surface and a sealing member. The sealing member is configured to sealingly contact a specimen-bearing surface of a microscope slide to define a flow cell between the surface of the slide engagement region and the specimen-bearing surface. In some embodiments, the reaction chamber/flow cell can be sealed by one or more valves (e.g., valves positioned along entry and exit ports, fluid lines, or passageways), and the sealing arrangement provided via the reaction chamber seals. Reagents can be held in the reaction chamber to maintain hydration of the specimen and provide a suitable target with associated marker, e.g., an antibody, DNA probe, dye molecule, etc. The microfluidic slide processing module, including the sealed reaction chamber, can then be heated to temperatures higher than the boiling temperature of the reagent (e.g., a primarily water based reagent) to provide enhanced target retrieval (e.g., antigen retrieval) or other processing, even low temperature processing. The flow cell area can be provided with suitable physical support on upper and lower surfaces to ensure seals are maintained even when high pressure is experienced. Such high pressures can inhibit or prevent boiling when the reagent is at temperatures equal to or higher than 100° C., 105° C., 110° C., 115° C., or 120° C. such that enhanced staining can be achieved in very short periods of time. Fresh reagent can be pumped through an open inlet valve and into the reaction chamber while used reagent is pushed through an open outlet valve. The inlet and outlet valves can be closed again to perform additional high temperature steps.

In some embodiments, a slide processing module includes reagent elements and a cell connected to the reagent elements. The cell can include a slide-receiving region dimensioned to receive a microscope slide and a cover having a gasket that contacts a specimen-bearing surface of the microscope slide to define a reaction chamber between the cover and the specimen-bearing surface. The flow cell is configured to receive reagent from each one of the reagent elements and to deliver the received reagent to the reaction chamber. The slide processing module can be a single-use consumable device.

In further embodiments, a method includes processing a specimen that is carried on a mounting surface of a microscope slide and located in a reaction chamber of a flow cell of the microscope slide module. The reaction chamber is at least partially defined by the mounting surface and a gasket contacting the mounting surface. Processing the specimen can include delivering a first reagent from a first reservoir of the microscope slide module to the reaction chamber and delivering a second reagent from a second reservoir of the microscope slide module to the reaction chamber to drive the first reagent into at least one waste container of the microscope slide module.

The processing module can be delivered to an automated instrument while the microscope slide module carries most of the reagents, by volume or weight, that are subsequently used in the specimen processing. After processing the specimen, the processing module can be removed from the automated instrument. The waste container can be separate from a base of the microscope slide module. The base can carry the first and second reservoirs.

In further embodiments, a method includes processing a plurality of specimens within the same microscope slide module. The processing can include applying the same reagents to multiple specimens either simultaneously or sequentially.

In yet further embodiments, a stainer unit includes regents and a reaction cell configured to at least partially define a reaction chamber. The stainer unit can include a fluid circuit that allows the reagents to be delivered to the reaction chamber. The fluid circuit can seal the reaction cell to inhibit or prevent evaporation and/or boiling of one or more of the reagents in the reaction chamber during, for example, high-temperature processing. The fluid circuit can include one or more valves in fluid communication with the reaction chamber. The valves can be located along passageways in fluid communication with the reaction chamber. In some embodiments, the fluid circuit allows the regents to be sequentially delivered to the reaction chamber and inhibits or prevents fluid flow away from reaction chamber. The sealed reaction cell can increase a boiling point of the reagent to accelerate high-temperature antigen/target retrieval. The reaction chamber can be located along a specimen-bearing surface of a microscope slide or at another suitable location, and the reaction cell can be a flow cell through which reagents can flow and be held in contact with the specimen.

In some embodiments, a method includes performing a plurality of specimen processing operations on a specimen held in a flow cell at least partially defined by a mounting surface of a slide carrying the specimen. The processing can include sequentially delivering reagents from two or more reservoirs of a microscope slide processing module to a reaction chamber of the flow cell. The used reagent can be delivered into a waste container fluidly coupled to the flow cell. The processing module can carry the microscope slide while the processing module is removed from and/or delivered to an automated instrument. Each reagent can be delivered through a fluid circuit of the processing module to deliver reagent into the reaction chamber and to deliver waste reagent to waste container.

The method can include sequentially delivering a first reagent from the first reservoir to the reaction chamber, delivering a wash liquid to the reaction chamber, and delivering a second reagent from the second reservoir to the flow cell. The wash liquid can remove most of the first reagent by volume from the reaction chamber prior to delivery of the second reagent. For example, a sufficient volume of wash liquid can be delivered to remove most of the first reagent, by weight or volume, from the reaction chamber prior to delivery of the second reagent. Additional alternating wash and reagent cycles can be performed.

The microscope slide processing module can be delivered to an automated instrument while the processing module carries most of the reagents that are used in specimen processing operations. After performing specimen processing operations, the processing module can be removed from the automated instrument. The waste container can be separated from a base of the processing module for disposal.

In some embodiments, a significant portion or most of the reagent in one or more of the reservoirs is delivered to the flow cell to process the specimen. For example, most of the reagent contained in the processing module is carried in the waste container upon completion of the specimen processing operations. During processing, multiple aliquots of reagent can be delivered from the same reservoir to the flow cell. After completion of the specimen processing operations, most of the reagent, by weight, can be carried by the waste container. For example, at least 30%, 40%, 50%, 60%, 70%, 80%, 90%, and 95% of the total volume of reagent carried by the processing module is contained in the waste container.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

DETAILED DESCRIPTION

The following description of several embodiments describes non-limiting examples of the disclosed system and methods to illustrate the technology. Furthermore, all titles and headings provided herein are for convenience only and are not intended to limit or interpret the scope or meaning of the invention. Specific details of several embodiments of the disclosed technology are disclosed herein with reference to FIGS. 1-27. Although stainer units are discussed primarily in the form of microfluidic slide processing modules, the stainer units can be in other forms as discussed in connection with FIGS. 5-26. It should be noted that other embodiments in addition to those disclosed herein are within the scope of the disclosed technology. For example, embodiments of the disclosed technology can have different configurations, components, substances, and/or procedures than those shown or described herein. Moreover, a person of ordinary skill in the art will understand that embodiments of the disclosed technology can have configurations, components, substances, and/or procedures in addition to those shown or described herein and that these and other embodiments can be without several of the configurations, components, and/or procedures shown or described herein without deviating from the disclosed technology.

I. Overview of Automated Processing Systems

Figure 1:
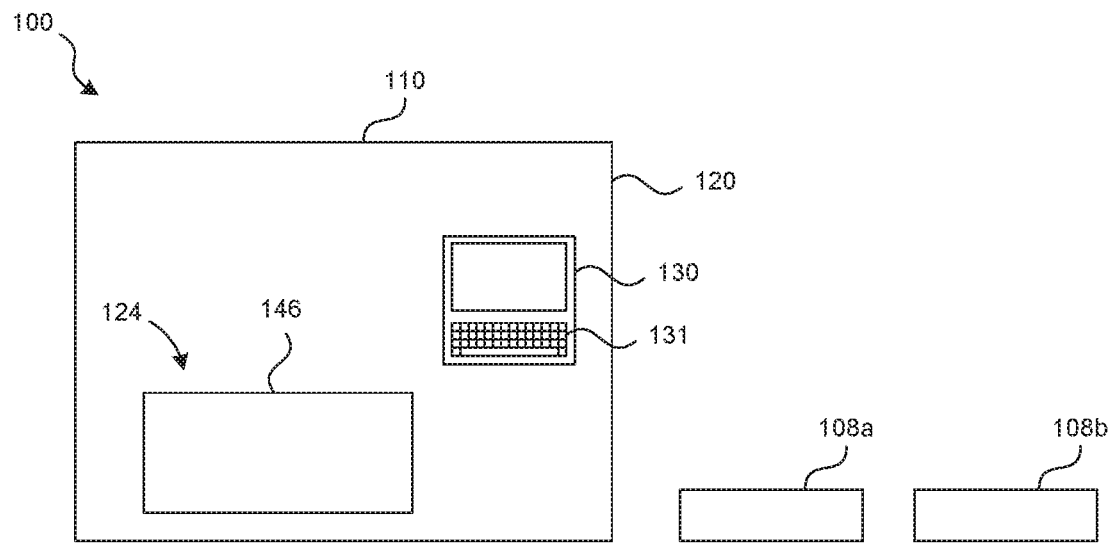
FIG. 1 is a front view of an automated specimen processing system in accordance with an embodiment of the disclosed technology.

FIG. 1 is a front view of an automated specimen processing system 100 ("system 100") in accordance with an embodiment of the disclosed technology. The system 100 can include a robotic staining instrument 110 and consumable stainer units 108a, 108b. The staining instrument 110 can include a protective housing 120, a loading zone or loading station 124 ("station 124"), and a controller 130. The station 124 can include a door or access port 146 for loading and unloading stainer units 108a, 108b, illustrated schematically, carrying specimen-bearing microscope slides. Each stainer unit 108a, 108b can contain sealed reagent reservoirs and a waste container. The staining instrument 110 can use the reagents on-board stainer units 108a, 108b to process the specimens. After processing, the stainer units 108a, 108b can be retrieved from the instrument 110, the specimen-bearing slides can be removed from the stainer units 108a, 108b, and the specimens can be analyzed. The system can be provided with storage capability, for example a stainer unit holding rack from which the system can access stainer units to be processed, and capable of re-inserting stainer units at various stages of assay completion.

Each stainer unit 108a, 108b (collectively "stainer units 108") can contain most or all of the substances for performing the assay, for example, specimen conditioning (e.g., cell conditioning, washing, etc.), antigen/target retrieval, staining (e.g., hematoxylin and eosin staining), or other types of protocols (e.g., immunohistochemistry protocols, in situ hybridization protocols, etc.) for preparing specimens for visual inspection, fluorescent visualization, microscopy, microanalyses, mass spectrometric methods, imaging (e.g., digital imaging), or other analytical or imaging methods. The fluids can be held in airtight containers to minimize or limit the possibility of reagent oxidation that could impact staining even when the stainer unit is stored for relatively long periods of time (e.g., months or years). The single doses also limit thermal exposure to other stored reagents when taken out of temperature controlled environments (e.g., when removed from a refrigerator). The stainer units 108 can include a reaction chamber and fluid lines, channels, valves, ports, pressurization devices (e.g., pumps, syringes, etc.), or other components for fluidly communicating with the reaction chamber. The stainer units 108 can also include one or more mixing components (e.g., mixing wells, reagent trays, etc.) for mixing reagents in, for example, lyophilized and/or liquid form. The configuration of the stainer unit and onboard substances can be selected based upon the staining protocol to be performed and functionality of the staining instrument 110.

Multiple stainer units can be available to perform different protocols. For example, the stainer unit 108a can have reagents for performing hematoxylin and eosin (H&E) staining and the stainer unit 108b can have reagents for performing advanced staining protocols, such as immunohistochemistry protocols or in situ hybridization protocols. In some single-use embodiments, each stainer unit 108 can carry a sufficient amount of reagent to perform only a single protocol using fresh reagents to avoid producing excess reagent waste. The reagent reservoirs and waste containers can be permanently sealed to prevent reuse. The sealed containers can also facilitate disposal. In some multi-use embodiments, the reagent reservoirs can be refilled any number of times and the reagent chamber can be flushed and washed. The stainer units 108 can contain waste materials for convenient disposal. The waste materials can include waste reagents, wash solutions, or other fluids that can be collected in a removable waste container that can be discarded separately from other components of the stainer unit 108. This allows for separate handling of unused and used liquids.

The controller 130 can be used to select protocols and can receive information. The information can be inputted by the user using an input device 131, such as a keyboard, a touchscreen, or the like. In some embodiments, the staining instrument 110 includes one or more readers in communication with the controller 130. The readers can obtain information from machine readable labels, barcodes, or other types of labels applied to, for example, the microscope slides, stainer units, or reagent reservoirs. The controller 130 can command system components based, at least in part, on the obtained information, and can generally include, without limitation, one or more processors, computers, central processing units, microprocessors, digital signal processors (DSPs), application-specific integrated circuits (ASICs), readers, or the like. In some embodiments, the controller 130 can be programmed to receive information from microscope slides, process specimens based on the received information, and acquire one or more images of processed specimens.

To store information, the controller 130 can include, without limitation, one or more storage elements, such as memory (e.g., volatile memory, non-volatile memory, read-only memory (ROM), random access memory (RAM)). For example, the memory can be non-transitory computer-readable memory that stores instructions that, when executed by a processor, cause the controller 130 to perform operations. The stored information can include, without limitation, reagent information, expiration information (e.g., expiration dates), stainer unit information, staining protocols, reagent recipes, heating or cooling programs, optimization programs, calibration programs, indexing programs, databases, imaging programs, and/or executable programs. The protocols can include reagent protocols (e.g., number and/or order of reagents applied), thermal protocols (e.g., heating/cooling routines), and other executable instructions for processing slides. The stored information can be used to determine, for example, protocols for processing the stainer unit based on information acquired from the stainer unit, inputted by an operator, or both, for example. In some embodiments, the instrument 110 can obtain information from the stainer unit and additional information from the microscope slide. The stainer unit information can indicate reagent volumes, staining protocol, or the like. The microscope slide information can include tissue information and staining to be performed. Based on that information, the controller 130 can determine an appropriate protocol for processing the tissue specimen based on the available resources, and if another stainer unit should be used, a notification can be provided to the user.

In operation, a user can manually load the stainer unit 108 with a specimen-bearing microscope slide. The user can visually confirm proper loading and can then feed the stainer unit 108 to the instrument 110. In other embodiments, the user separately loads microscopes slides and stainer units 108 into the staining instrument 110, which can robotically load the stainer units with the microscope slides. Closed reagent chambers of the stainer units 108 can prevent, limit, or minimize evaporative losses, stain degradation, cross-contamination between slides (typically experienced with dip and dunk systems), or other problems, thereby enabling control of reagent characteristics (e.g., concentrations, mixtures, etc.) to enhance the effectiveness of the reagents and resulting in desired staining characteristics. The sealed closed reagent chambers can be pressurized to enable high temperature antigen retrieval to inhibit or prevent boiling of the reagent.

The staining instrument 110 can controllably dispense fresh processing liquids onto the slides without splattering onto its mechanical or electrical components, as well as adjacent slides often present in conventional pipetting systems, and can controllably remove processing liquids from the slides via vacuum or liquid replacement or other suitable means. The controlled reagent dispensing/removal reduces volumes of liquid waste (e.g., waste reagents which have passed through the reaction chamber) by, for example, minimizing or otherwise limiting volumes of utilized reagents. In some embodiments, specimen processing may include contacting specimens with a series of liquids that include, for example, one or more deparaffinizing liquids, conditioning liquids, staining reagents, stain-differentiating reagents, stain-setting reagents, washing liquids, and/or coverslipping liquids.

The stainer units 108 can contain the reagents throughout processing such that the staining instrument 110 can process specimens without contacting the reagents. For example, the stainer units 108 can hold aliquots of reagent and can cause reagents to flow into a reaction chamber and into contact with a specimen. In some procedures, most of the reagent from multiple reservoirs is delivered to the flow cell to process the specimen. Most of the reagent, by volume, can be contained in the stainer units 108 is carried in a waste container upon completion of the specimen processing operations. For example, the waste container contains most of the reagent, by weight or volume, carried by the used stainer unit 108. In some procedures, the waste container contains at least 30%, 40%, 50%, 60%, 70%, 80%, 90%, and 95% of the total volume of reagent carried by the stainer unit. The used stainer unit 108, which still carries the unused reagents and waste reagent, can be removed from the instrument 110 for subsequent disposal.

Closed reagent chambers can prevent, limit, or minimize evaporative losses, stain degradation, cross-contamination between slides (typically experienced with dip and dunk systems), or other problems, thereby enabling control of reagent characteristics (e.g., concentrations, mixtures, etc.) to enhance the effectiveness of the reagents and resulting in desired staining characteristics. The stainer units 108 can have integrated coverslips for viewing the specimen, thereby avoiding an additional coverslipping step. In some embodiments, the staining instrument 110 can perform a coverslipping operation. After coverslipping, the stainer unit 108, which carries the coverslipped slide, can be retrieved at the station 124. In other embodiments, the microscope slide can be coverslipped after removal from the instrument 110. Additional processing can be performed on the slide.

Figure 2:
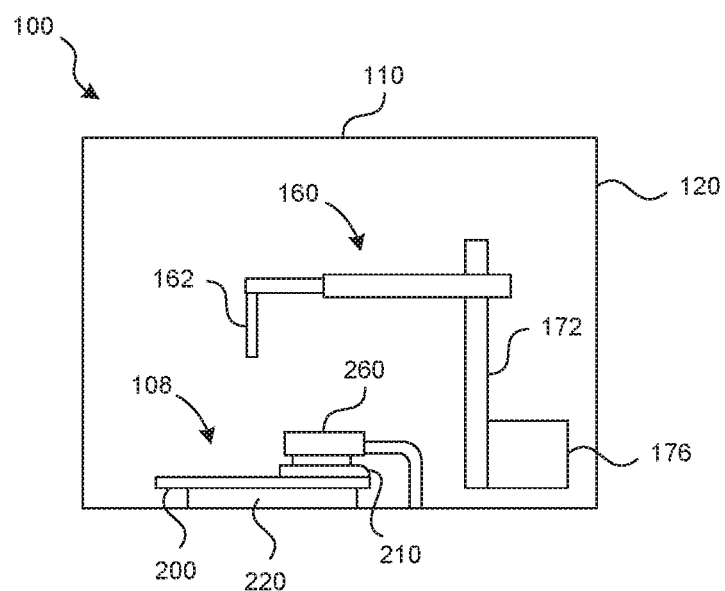
FIG. 2 is a front view of internal components of the specimen processing system of FIG. 1.

FIG. 2 is a front view of internal components of the instrument 110 in accordance with an embodiment of the disclosed technology. The instrument 110 can include a dispenser apparatus 160 configured to operate the stainer unit 108 in the form of a microfluidic slide processing module. The stainer unit 108 can include a base 200 and a reaction or flow cell 210 ("flow cell 210"). The dispenser apparatus 160 can deliver reagents carried by the base 200 to the flow cell 210. The flow cell 210 can be a microfluidic cell capable of holding small volumes of liquid. This allows all or most of the reagents, by volume or weight, to be carried onboard the stainer unit 108. For example, microfluidic flow cells can hold less than, for example, about 25 µL, about 50 µL, about 100 µL, about 150 µL or about 200 µL. In some embodiments, the flow cell 210 can hold about 25 µL to about 100 µL, about 50 µL to about 120 µL, about 75 µL to about 120 µL or other desired volumes. The specimen and reagent can be heated to a temperature equal to or higher than about 60° C., about 70° C., about 80° C., about 90° C., about 100° C., about 110° C., or about 120° C. In some embodiments, the instrument 110 operates to apply heat to the specimen to provide a dwell temperature equal to or less than about 60° C., about 70° C., about 80° C., about 90° C., about 100° C., about 110° C., or about 120° C. for a period of time. The period of time can be equal to or less than about 10 minutes, about 15 minutes, or about 20 minutes. In some embodiments, the flow cell 210 generates thermal energy to heat the specimen and/or reagents. For example, the flow cell 210 can include one or thermal elements (e.g., resistive heaters, Peltier devices, etc.) to generate the thermal energy. The thermal elements can also cool the specimens.

The flow cell 210 can be used for deparaffinization, antigen/target retrieval, and staining using minimal volumes of fluid and can be configured for mixing (e.g., via agitation) or producing minimal diffusion layers to minimize or limit processing times. The flow cell 210 can contact the mounting surface of the slide to form a fluid-tight seal that is maintained throughout processing even when heat is applied to the specimen and the reagent, with a dwell at 90° C., 100° C., 110° C., 120° C. for up to about 20 minutes. The liquid reagent, such as primarily water based reagents, can be heated to temperatures higher than their normal boiling points to provide enhanced antigen/target retrieval. The flow cell area can be isolated by one or more seals (e.g., air-tight seals, fluid-tight seals, etc.) that can be maintained even when high pressures are experienced. This ensures that the reagents do not boil even at high altitude when the reagent is a temperature equal to or higher than 100° C., 105° C., 110° C., 115° C., or 120° C. The high-temperature processing enables enhanced staining in very short times. In some embodiments, the stainer units have pressurizable flow cells for high-temperature antigen/target retrieval. To raise the boiling point of the reagent, one or more valves can seal the reaction chamber by inhibiting or preventing the flow of fluid out of the reaction chamber, thereby raising a boiling point of the reagent. For example, the reaction chamber can be closed and pressurizable to raise the boiling point of the reagent (e.g., a reagent with a suitable target/antibody with associated marker) at least about 5%, 10%, 20%, or 30%.

The flow cell 210 can also remain sealed during processing to limit or prevent specimen loss, air bubble formation, or other problems, such as measurable evaporative losses. Thermal energy can be delivered uniformly or non-uniformly across the slide via conduction to produce a substantially uniform temperature profile along a specimen-bearing portion of the slide surface. In some embodiments, the substantially uniform temperature profile has a temperature variation equal to or less than a selected temperature variation across the specimen-bearing surface to achieve acceptable stain variation intensity. Non-uniform temperature profiles can also be produced along the slide or specimen if desired.

In some IHC protocols, multiple rinses at temperatures in a range between about 20° C. and about 70° C. can be applied. The rinses can include, without limitation, hydrophobic substances and organic solvents. Multiple dispense and removal steps can be performed. Each step can be performed at temperatures in a range of about 20° C. to about 70° C. and can utilize predetermined amounts of multiple reagents. The reagents can be combined prior to tissue contact. During a dwell period, the reagents within the flow cell can cover the entire specimen and, in some embodiments, can be agitated to achieve suitable staining performance. The sample can then be dehydrated and a coverslipping agent can be applied to the slide. A coverslip can be applied and the coverslipping agent can be heated to a suitable curing temperature (e.g., 70° C., 80° C., 90° C., or another suitable temperature). Alternatively, the flow cell can have an integrated coverslip. The stainer unit can allow visual access to both sides of the slides for automated imaging and visual inspection of the specimen.

The instrument 110 can perform one or more washing cycles to add and subsequently wash reagents from the flow cell 210. After incubation, reagent can be washed from the flow cell 210 to remove unreacted reagent that could affect a subsequent processing step. A washing cycle can include flushing the flow cell 210 with an excess of buffer or wash solution. The unreacted reagent can be diluted with the excess volume of the buffer or wash solution and driven out of the flow cell. In some embodiments, a washing cycle can include flushing the flow cell 210 with the wash solution. The wash solution could be miscible or immiscible with the prior reagent. In some embodiments, a washing cycle can include flushing the flow cell with a gas (e.g. air). In some protocols, a washing cycle can be performed for fluid exchange after each incubation.

Dispenser apparatus 160 can include a transporter apparatus 172 and an end effector 162. The transporter apparatus 172 can include, without limitation, one or more rail assemblies, robotic handlers, X-Y-Z transport systems, conveyors, drive elements 176 (e.g., actuators, drive motors, or the like), or other automated mechanisms or components. In some embodiments, the dispenser apparatus 160 can include a plurality of pumps, compressors, vacuum devices (e.g., blowers), and/or other devices capable of pressurizing fluids and/or providing a vacuum (including a partial vacuum). To perform multi-step protocols, the end effector 162 can sequentially deliver reagents from reagent reservoirs to a reaction chamber of the flow cell 210. The end effector 162 can include, without limitation, one or more orifices (e.g., jewel orifices), ports, nozzles, valves (e.g., one-way valves, check valves, pressure relief valves, etc.), sensors (e.g., pressure sensors, fluid detection sensors, etc.), grippers, pipette holders, pressurization devices (e.g., pumps), or other components for operating stainer units, controlling liquid delivery, or the like. The configuration and functionality of the end effector 162 can be selected based on the configuration of the stainer unit 108.

The stainer unit 108 can include a closure device 260 (e.g., a clamp) that applies pressure to the microscope slide, flow cell 210, etc. For example, the closure device 260 can apply sufficient pressure to a backside of a microscope slide to maintain a seal at the front side of a downwardly facing slide. By way of another example, the closure device 260 can apply pressure to a cover overlying the front side of an upwardly facing slide. The slide can be a generally rectangular piece of a transparent material having a front side or face for receiving the specimen. The slide can have a length of about 75 mm (3 inches), a width of about 25 mm (1 inch), and a thickness of about 1 mm (0.04 inch) and, in certain embodiments, may include a label and such a label can include characters and/or other machine-readable codes such as a barcode or an RFID tag. In other embodiments, information can be etched into the microscope slide or included within the microscope slide. Other dimensions are also possible. The microscope slide can be a standard microscope slide made of glass. The stainer unit 108 and/or slide can be held at a substantially horizontal orientation. The term "substantially horizontal" generally refers to an angle within about +/−2 degrees of horizontal (for example, within about +/−1 degrees of horizontal, such as within about +/−0.5 degree). The horizontal orientation of the slide can help keep the specimens centered on the slide. The slide can be held at other orientations and positions. The flow cell 210 can be configured to hold other types of substrates capable of carrying specimens in the form of cytological preparations, micro-arrays, tissue arrays, or the like.

The biological specimens disclosed herein can include one or more biological samples that can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amebas, multicellular organisms (e.g., plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

With continued reference to FIG. 2, the dispenser apparatus 160 can be a robotic pipettor capable of retrieving, preparing, and/or dispensing liquids and can include, without limitation, one or more pipettor heads, aspiration tubes, valves, or other fluidic components. In some embodiments, the dispenser apparatus 160 has a single robotic pipettor configured to process one slide at a time. In other embodiments, the dispenser apparatus 160 can include a plurality of robotic pipettors for simultaneously processing multiple slides. The number, configurations, and functionality of the robotic pipettors can be selected based on the number of reagents to be simultaneously dispensed. A mixing station can be part of the stainer unit 108 or a part of the staining instrument 110 and can serve as a staging area that can significantly increase processing capacity or otherwise enhance processing. Reactive reagents, such as reagents that react immediately upon mixing, can be mixed immediately before dispensing to enhance stain consistency and quality. Because reagents can be staged before they are needed, slide processing capabilities can be increased.

The system discussed herein can be configured to operate non-pipetting stainer units. Such processing systems can include actuators, pushers, pressurizing devices, or other device capable of operating components of the non-pipetting stainer units. In some embodiments, the end effector 162 can cause reagents to be dispensed from blister elements of the stainer unit 108. For example, the end effector 162 can sequentially press down on an array of blister elements to sequentially process a specimen with different reagents. In other embodiments, the end effector 162 can be in the form of a pressurization nozzle configured to output pressurized fluid to cause liquids to flow from reagent reservoirs to the reaction chamber. The configuration and functionality of the end effector 162 can be selected based on the configuration of the stainer unit 108. Layouts and functionality of non-limiting exemplary processing systems are discussed in connection with FIGS. 3 and 4.

Figure 3:
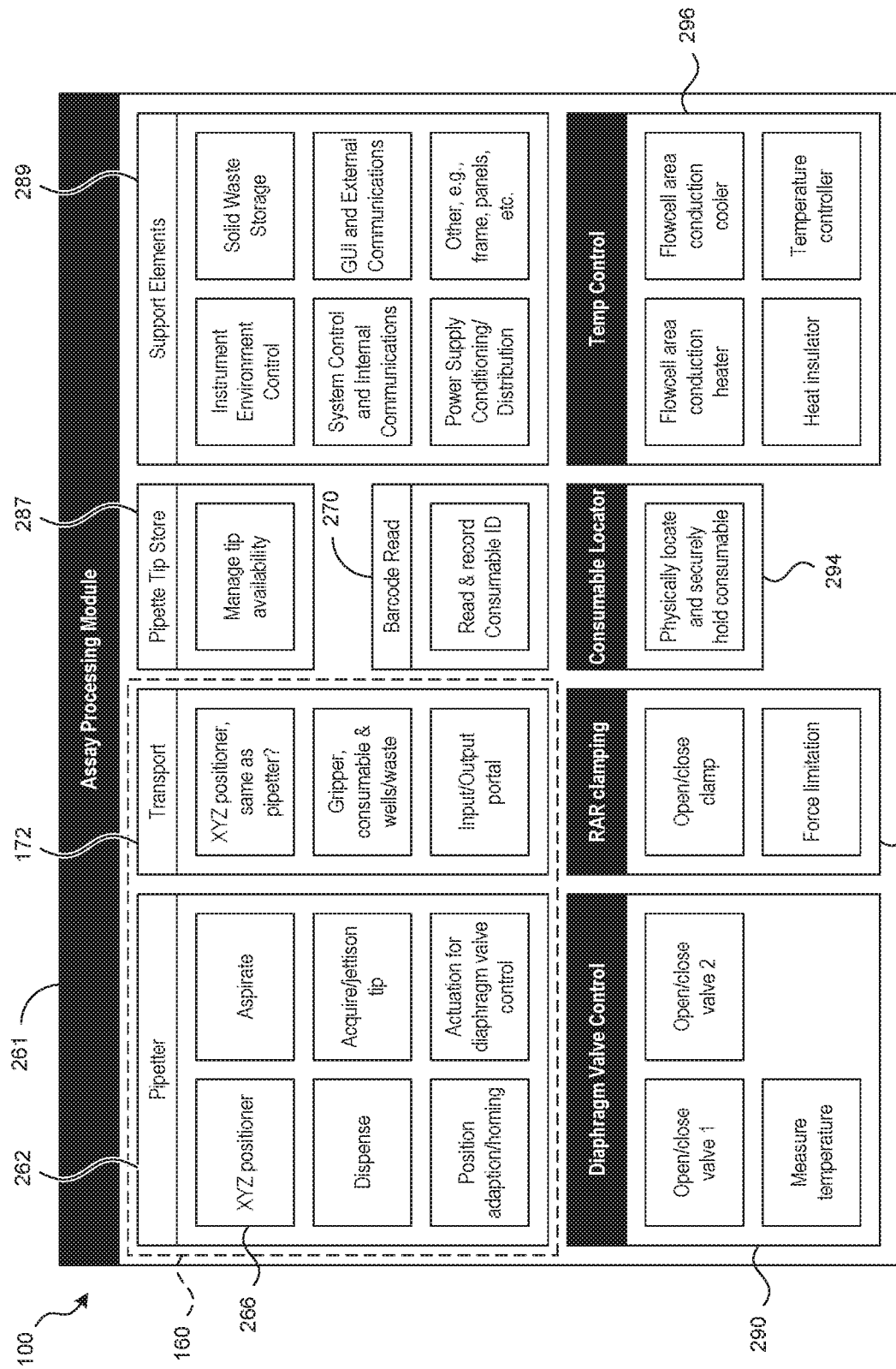
FIG. 3 is a block diagram of an automated specimen processing system with processing zones in accordance with an embodiment of the disclosed technology.

FIG. 3 is a block diagram of the system 100 in accordance with one embodiment of the disclosed technology. The system 100 can include an assay processing module 261 with a dispenser apparatus 160 that includes one or more pipettors 262 and the transporter apparatus 172. Each pipettor 262 can include one or more positioners 266 (e.g., XYZ positioners) for moving pipettes and fluid components (e.g., valves, fluid lines, etc.) for aspirating and dispensing. The pipettor 262 can acquire tips from a pipette tip storage unit 287 and jettison used tips at a waste area. The system 100 can include other dispenser apparatuses in addition to and/or in lieu of the pipettor 262.

A reader in the form of a barcode reader 270 can acquire information from stainer units, slides, containers or other items with labels or readable information. The information (e.g., consumable ID, tissue information, etc.) can be sent to a controller (e.g., controller 130 of FIG. 1). The controller can determine a processing protocol based on the received information. Multiple readers can be used to increase throughput. The number, positions, and configurations of the readers can be selected based on target throughput, reading capabilities, or other operating parameters.

The assay processing module 261 can include support elements 289. The support elements 289 can include one or more processors, sensors, controllers, waste containers, and housing components (e.g., frame, panels, etc.). Controllers can control processing environments, system components and/or communication and can include one or more displays for displaying GUIs or information, for example. Waste containers can store solid waste, such as used pipettor tips. The support elements 289 can include communication components (e.g., antennae, transmitters, ports, wireless modules, etc.), power supply conditioning/distribution components, or the like. The components and configuration of the support elements 289 can be selected based on, for example, whether the system 100 communicates with another system or network.

The assay processing module 261 can also include one or more control valve modules 290, clamping modules 292, consumable locator modules 294, and/or temperature control modules 296. The valve control modules 290 can include one or more sensors (e.g., pressure sensors, temperature sensors, etc.), valves (e.g., one-way valves, diaphragm or membrane valves, etc.), actuators (e.g., pushers for opening/closing diaphragm or membrane valves), and fluid lines, for example. The clamping module 292 can clamp onto the stainer unit. For example, the clamping module 292 can include a closure device (e.g., closure device 260 of FIG. 2) configured to apply pressure to a cell (e.g., a reaction cell, a flow cell, etc.), slide, or the like. The consumable locator module 294 can physically locate and securely hold consumables. The temperature control module 296 can be part of a base (e.g., base 220 of FIG. 2) and can include one or more thermal elements, insulators, controllers, or the like. Thermal elements can be conduction heaters/coolers, resistive heaters, and/or Peltier devices and can be capable of localized heating/cooling at the flow cell area, so the flow cell and its contents can be heated/cooled without substantially affecting the temperature of the stored reagents.

Figure 4:
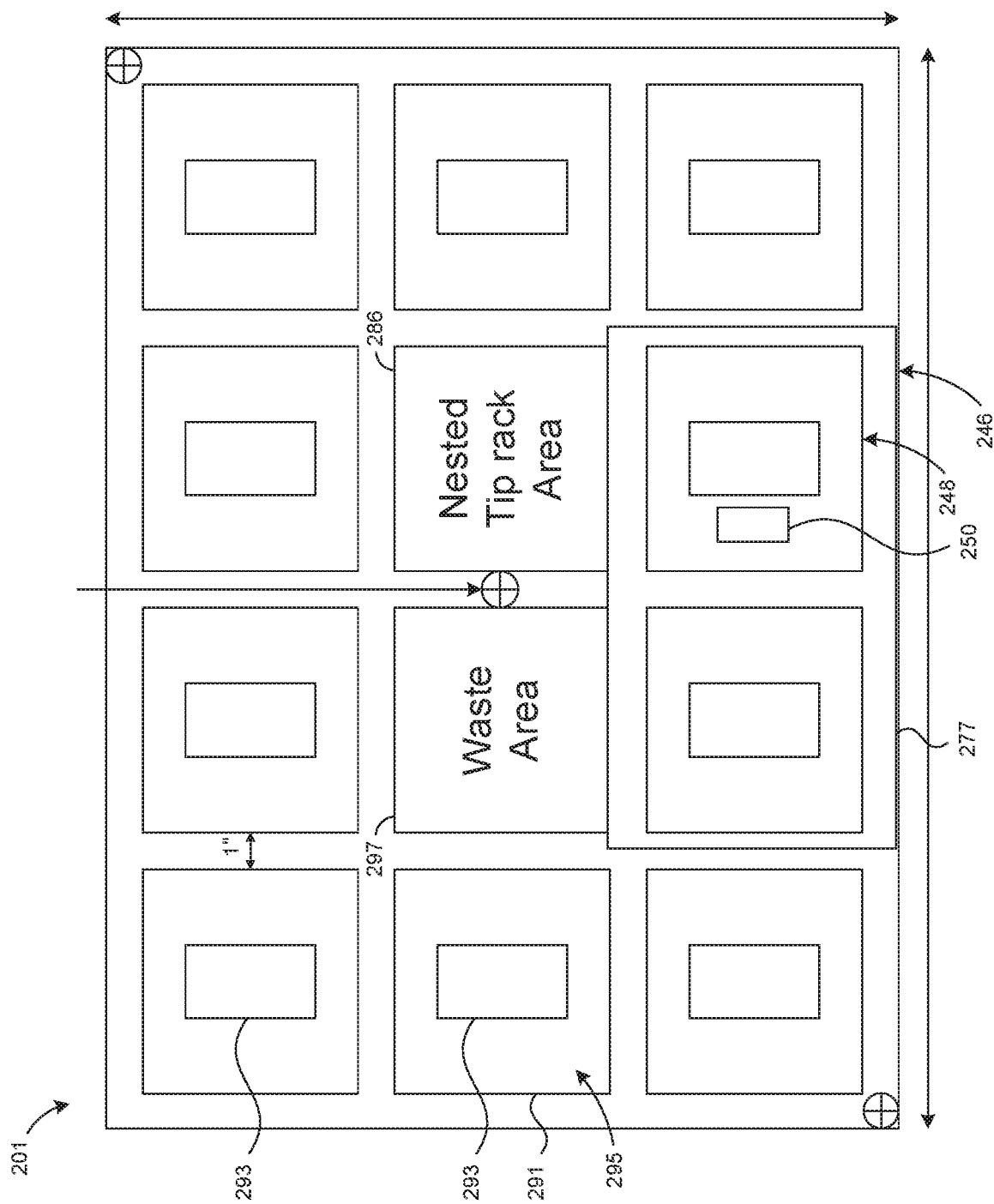
FIG. 4 is a plan view of an automated specimen processing system in accordance with an embodiment of the disclosed technology.

FIG. 4 is a top view of an automated slide processing system 201 configured for parallel processing of stainer units in accordance with an embodiment of the disclosed technology. The system 201 can include an array of processing zones or stations 291 (one identified), each capable of holding at least one stainer unit. Although the illustrated embodiment has eight stations 291, system 201 can have any number of stations. Each processing station 291 can include a station 293 (two separate ones identified) configured to receive modules/cartridges, stainer units, or the like. Processing areas 295 surround respective stations 293. The number of processing stations 291 can be selected based on the desired processing throughout. A waste reservoir or area 297 can include a container for collecting solid waste, liquid waste, or both. A supply station 286 can include a storage area (e.g., a nested tip rack area, a pipette tip storage area, etc.), coverslips, fluid containers, or the like.

In operation, stainer units can be manually or robotically loaded into the system 201 via a feed or input portal 246 ("input portal 246"). In some embodiments, an interrogation station 248 has a detector 250 positioned to analyze the slide, stainer units, or both. The detector 250 can include one or more readers, optical sensors, cameras, contact sensors, position sensors, or the like. A robotic transporter apparatus can retrieve stainer units from the station 248 and transport the retrieved stainer units to a desired zone or station. Each specimen-bearing slide can be processed based on one or more signals from the detector 250 according to, for example, one or more arbitrary user-defined sets of operations (e.g., a user-defined staining protocol), pre-defined sets of operations (e.g., preprogrammed protocol), or other processing instructions or routines. Processed stainer units can be parked at an output station 277. The number of processing zones can be selected based on the desired processing throughout, the components and functionality of each processing zone can be selected based on the processing protocols to be performed, and the configuration of the system 100 can be selected based on the desired system footprint.

Sensors can be located at various locations throughout processing systems, including on transporters, within the processing zones, and incorporated into stainer units. In some embodiments, sensors (including, without limitation, strain gauges, accelerometers, contact sensors, optical sensors, or other sensing devices capable of sensing certain events) can be used to detect contact, collisions, impacts, or other events. The sensors can output one or more signals that are received by a controller, which can determine whether a given event requires user notification or other action. For example, if an unexpected position of a cover of a stainer unit is detected, the controller can alert a user to open an access door to visually inspect the stainer unit to determine, for example, whether the slide or cover is positioned properly.

The stainer units can include an integrated coverslip that covers the specimen to enable analysis without removing the slide from the stainer unit. In other embodiments, a slide can be removed from the stainer unit for manual or robotic coverslipping. In robotic coverslipping embodiments, a coverslipper can apply solvent to slides and can then place coverslips with pre-applied adhesive onto the slides. In one embodiment, the coverslipper is substantially as described in U.S. Patent Application Publication No. 2004/0092024A1 or U.S. Pat. No. 7,468,161, which are incorporated by reference herein in their entireties. The coverslippers described in U.S. Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput. In some embodiments, the system 100 of FIGS. 1 and 3 can have a coverslipper. Additional modules can be added to the processing systems disclosed herein to provide any number of functionalities for processing of specimens with minimal or no human intervention during normal operation.

The number of processing zones or stations can be selected based on the desired processing throughout, and the components and functionality of each processing zone or station can be selected based on the processing protocols to be performed. The automated specimen processing system 100 or 201 can have any shape, and the processing zones be arranged in any manner. Each processing zone can be configured to hold any number of stainer units, for example, 1 stainer unit, 2 or more stainer unit units, 3 or more stainer unit, or 5 or more stainer units. For example, the processing zones or stations can be arranged in a linear arrangement, circular arrangement, or other suitable arrangement.

II. Stainer Units/Microfluidic Slide Processing Modules

Figure 5:
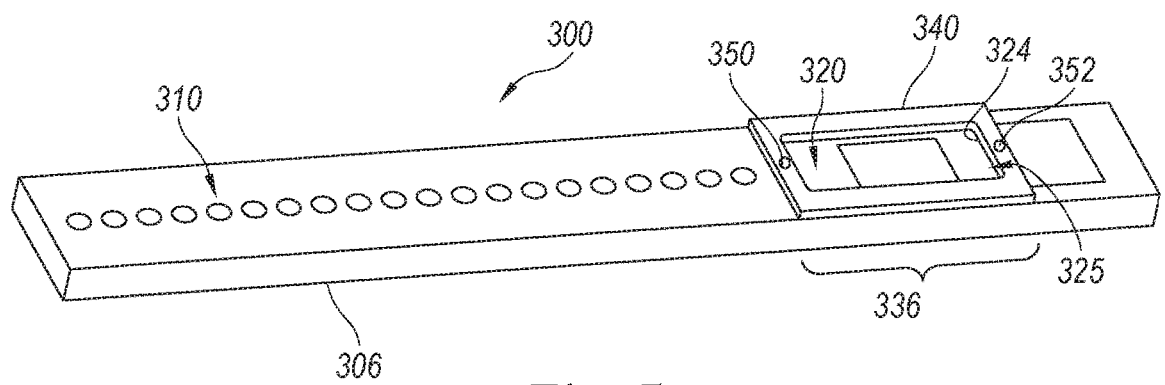
FIG. 5 is a perspective view of a stainer unit with reagent reservoirs in accordance with an embodiment of the disclosed technology.
Figure 6:
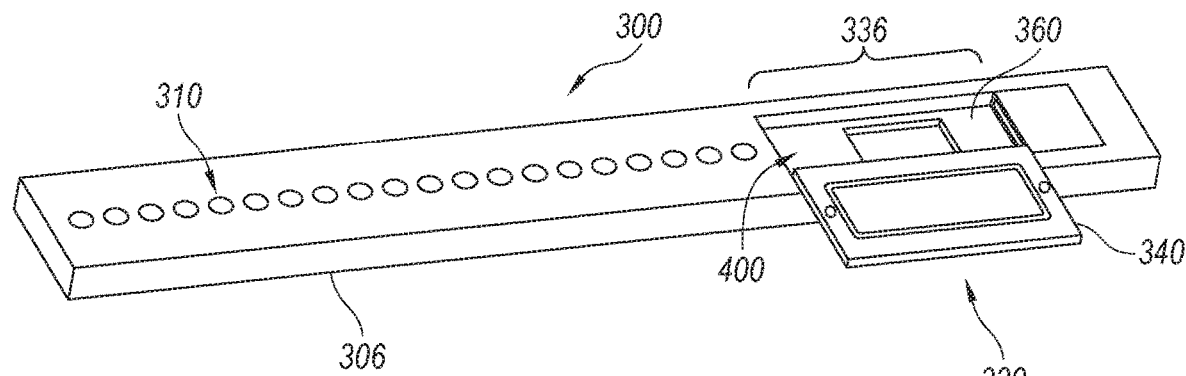
FIG. 6 is a perspective view of the stainer unit of FIG. 5 with a flow cell in an open configuration.

FIGS. 5 and 6 are perspective views of a stainer unit in the form of a consumable microfluidic slide processing module 300 ("processing module 300") in accordance with an embodiment of the disclosed technology. The processing module 300 can be used with an automated staining instrument and can include a main body or base 306 ("base 306"), reagent elements in the form of reservoirs 310 (one identified), and a flow cell 320. The flow cell 320 can include a bottom or clamp portion 336 and a flap or cover 340 ("cover 340") that sealingly engages a specimen-bearing upper surface of a slide to define a reaction chamber. The cover 340 is movable between a closed position (FIG. 5) for specimen processing and an open position (FIG. 6) for loading and unloading the slide. The flow cell 320 can include an inlet or input port 350, an auxiliary port 352, and a window 324 (FIG. 4) for viewing and imaging the processed specimen. In some embodiments, the window 324 can include an optically transparent element 325 positioned to cover the specimen to permit viewing and imaging of the processed specimen without performing an additional coverslipping process. The optically transparent element 325 can be made of glass, plastic, or other optically transparent material suitable for contacting reagents.

FIG. 6 shows the flow cell 320 with a slide-receiving region 360 dimensioned to receive the slide. The slide-receiving region 360 can be a recessed region in the bottom portion 336 of the base 306 with a depth generally equal to or greater than the thickness of the slide. In some embodiments, the slide-receiving region 360 is defined by one or more slide engagement features (e.g., pins, protrusions, etc.) that cooperate to surround and hold the slide.

Figure 7:
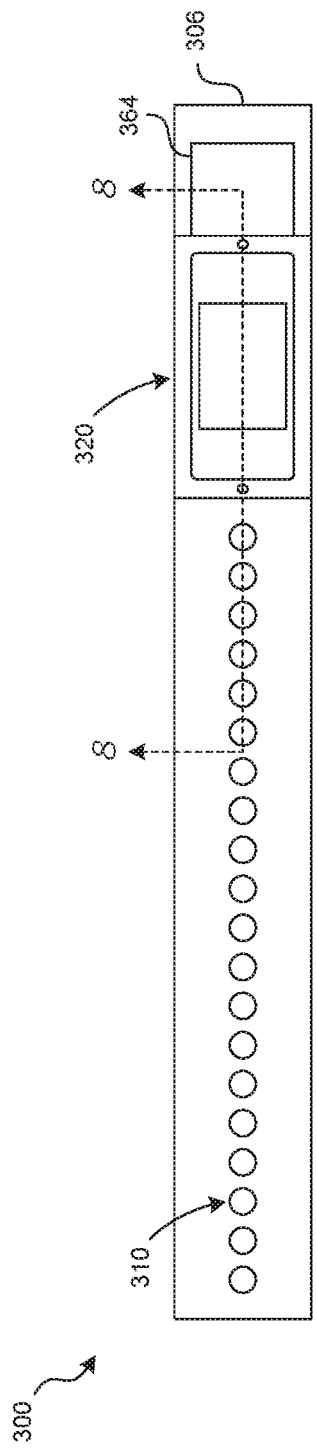
FIG. 7 is a top view of the stainer unit of FIG. 5.

In operation, the automated systems discussed in connection with FIGS. 1-4 can deliver reagents from the reservoirs 310 to the flow cell 320. A mechanical device can apply constant or varying pressure to the cover 340. A rotatable driver can gradually increase a closing force until a force limiter (e.g., torque limiter) engages to limit the applied force to an acceptable level. Additionally or alternatively, a controller can be used to control the clamping forces. In manual embodiments, a user can manually press the cover 340 against the slide and a clip, a latching mechanism, and/or another feature can hold the cover 340 against the slide. Once the flow cell 320 is closed, a dispense cycle can be performed by translating a pipette to one of the reservoirs 310, breaking a cover (e.g., puncturing the cover) of the reservoir 310, aspirating fluid from the reservoir 310, mating the pipette with the inlet port 350, and delivering the fluid into the flow cell 320. To prevent backflow, the flow cell 320 can include one or more valves (e.g., check valves, gate valves, globe valves, etc.). The reagent can be allowed to reside in the reaction chamber for a selected period of time. In some high-temperature procedures, the flow cell 320 can be sealed to inhibit or prevent boiling of the liquid. Additional reagents can be delivered into the flow cell 320 to periodically refresh or flush out reagent FIG. 7 is a top view of the processing module 300. As fresh reagent is pumped into the flow cell 320, waste reagent can automatically flow from the flow cell 320 to the waste container 364. The partially or completely filled waste container 364 can be removed from the base 306, thereby allowing for separate disposal of the waste container 364 and other components of the processing module 300. In some procedures, a single waste container 364 collects all of the reagent used in a staining protocol. In other procedures, multiple waste containers are used to collect reagents to prevent mixing of incompatible reagents.

Figure 8:
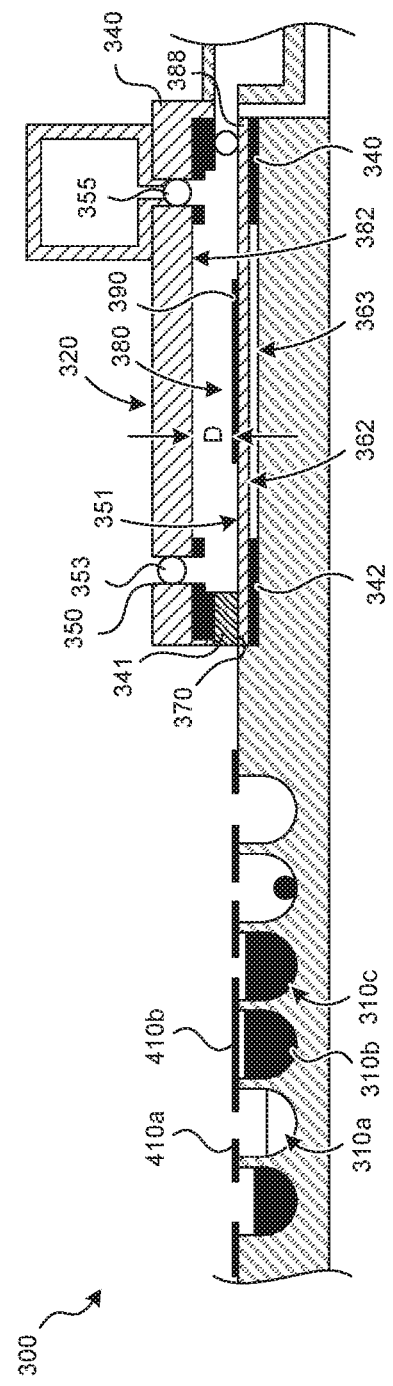
FIG. 8 is a cross-sectional view of the stainer unit taken along line 8-8 of FIG. 7.

FIG. 8 is a cross-sectional view of the processing module 300 taken along line 8-8 of FIG. 7. A reaction chamber 380 can be defined between a lower surface 382 of the cover 340 and the specimen-bearing surface 351 of the slide 362. A distance D between the lower surface 382 and the specimen-bearing surface 351 can be selected based on the desired fluid flow along the specimen 390. When the chamber 380 is filled with reagent, the reagent can contact both the specimen-bearing surface 351 and the lower surface 382 to ensure that the reagent covers the entire specimen 390.

The flow cell 320 can include a cover gasket 341 and a base gasket 342. The cover gasket 341 can be coupled to, embedded in, or otherwise attached to the cover 340 and can sealingly engage the slide surface 351 to form a seal 370. The seal 370 can surround, either partially or completely, a specimen-bearing region of the slide surface 351 and can be a fluid-tight seal, a hermetic seal, or other desired seal for containing fluids, whether in liquid or gas form. The characteristics, configuration, and composition of the cover gasket 341 can be selected based on the desired interaction with the slide.

The description of the cover gasket 341 applies equally to the base gasket 342 unless indicated otherwise. The base gasket 342 can inhibit or prevent liquids from flowing underneath the microscope slide 362 and affecting processing of subsequent slides. The base gasket 342 can contact the back surface 363 to form a seal 388 (e.g., a fluid-tight seal, a hermetic seal, or other desired seal) and can be coupled to, embedded in, or otherwise attached to the base 306. The base gasket 342 can surround, either partially or completely, a central region of the back surface 363. In some embodiments, one or both gaskets 341, 342 are resiliently compressible and made, in whole or in part, of silicone, rubber, elastomers, or the like. The gaskets 341, 342 can be one-piece sealing members, and in other embodiments, they can be multi-piece sealing members.

The reservoirs 310 can be wells integrally formed in the body 306 or can be separate components permanently coupled to the body 306. Although the illustrated reservoirs 310 have the same holding capacities, the reservoirs 310 can have different configurations and holding capacities. For example, the holding capacity of a reagent reservoir 310 for holding wash solutions can be significantly larger than the holding capacity of a reagent reservoir 310 for holding stains. In some embodiments, the reservoir 310a (FIG. 8) can have a holding capacity equal to or greater than 300 µl and the reagent reservoir 310b can have a holding capacity equal to or less than 100 µl. The holding capacities of the reservoirs 310 can be selected based on the staining protocol to be performed. The reservoirs 310 can have removable or frangible covers capable of temporarily sealing the reservoirs. For example, reagent covers 410a, 410b (collectively "reagent covers 410") can seal respective reagent reservoirs 310a, 310b. The illustrated cover 410a is broken, and the cover 410b is unbroken.

The input port 350 can include a fluid element 353, which can include one or more entry valves (e.g., butterfly valves, ball valves, check valves, etc.) that can be opened and closed to seal the reaction chamber 380 for high temperature processing, such as antigen retrieval. A fluid element 355 can include one or more exit valves configured to be opened and closed to seal the reaction chamber 380. When the fluid elements 353, 355 seal the reaction chamber 380, liquid reagent, such as primarily water based reagents, can be heated to temperatures higher than their normal boiling points (e.g., boiling points at atmospheric pressure) to provide enhanced antigen retrieval. The reaction chamber 380 can be isolated by one or more seals (e.g., air-fluid-tight seals 370) that can be maintained even when high pressures are experienced. This ensures that the reagents do not boil when the reagent is at a temperature equal to or higher than about 100° C., about 105° C., about 110° C., about 115° C., or about 120° C. The high-temperature processing enables enhanced staining in relatively short periods of time. To raise the boiling point of the reagent, the fluid elements 353, 355 can seal the reaction chamber 380 by inhibiting or preventing the flow of fluid out of the reaction chamber, thereby raising a boiling point of the reagent. For example, the reaction chamber 380 can be closed and pressurizable to raise the boiling point of the reagent (e.g., a reagent with a suitable target/antibody with associated marker) at least about 2%, about 5%, about 10%, about 20%, or about 30%.

Figure 9:
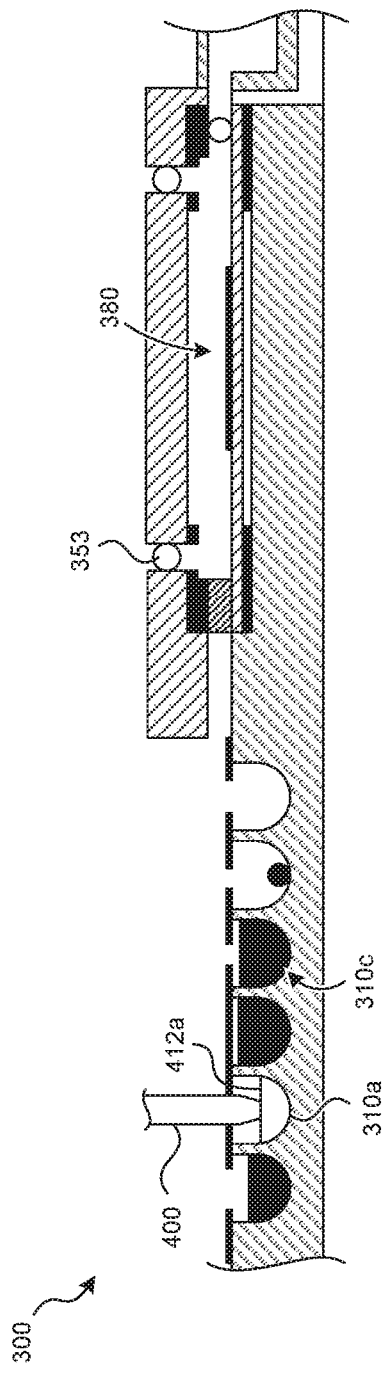
FIGS. 9-11 illustrate stages for processing a specimen in accordance with an embodiment of the disclosed technology.
Figure 10:
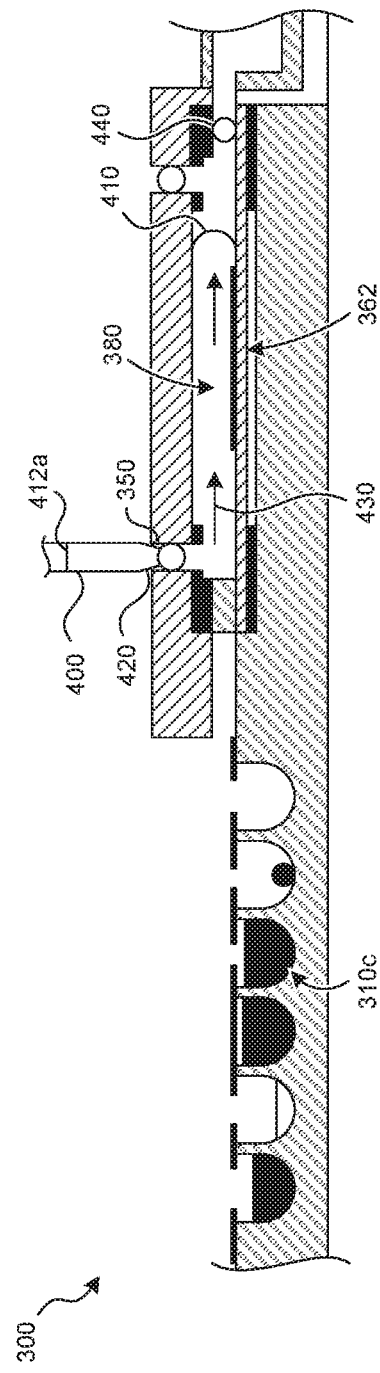
Figure 11:
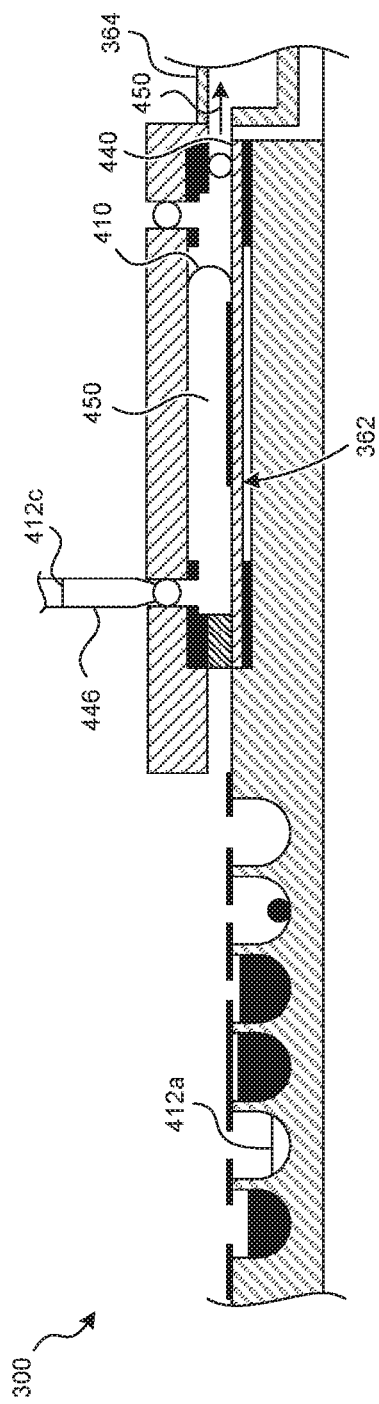

FIGS. 9-11 illustrate stages for processing a specimen in accordance with an embodiment of the technology. FIG. 9 shows a pipette 400 aspirating reagent 412a from the reservoir 310a. FIG. 10 shows a tip 420 of the pipette 400 after it has mated with the input port 350. The pipette 400 can deliver the reagent 412a through the input port 350 and into the reaction chamber 380, as indicated by the arrows 430 (one identified). The pipette 400 can be used to deliver additional reagents to the reaction chamber 380. FIG. 11 shows a pipette 446 delivering another reagent 412c to flush out reagent, which can flow through an outlet 440 and into the waste container 364. Any number of reagents can be delivered to the flow cell to perform a wide range of protocols.

Figure 12:
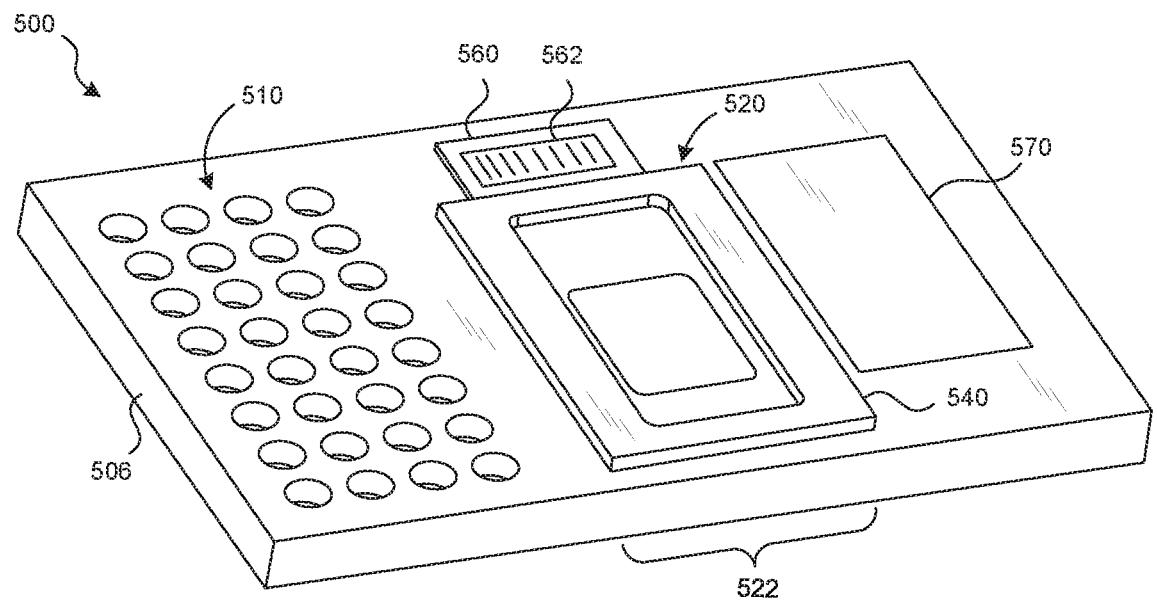
FIG. 12 is an isometric view of a pipettor stainer unit in accordance with an embodiment of the disclosed technology.

FIG. 12 is an isometric view of a consumable microfluidic slide processing module 500 ("processing module 500") in accordance with an embodiment of the disclosed technology. The processing module 500 can include a microtiter base 506 and a flow cell 520. The microtiter base 506 has reagent elements in the form of reservoirs or wells 510 arranged in rows and columns. The number, pattern, and spacing (e.g., regular or irregular spacing) of the wells 510 can be selected based on the range of motion and positioning accuracy of the pipettor. The microtiter base 506 connects the flow cell 520 to the wells 510. When the microtiter base 506 is at a generally horizontal position, the flow cell 520 can hold the microscope slide at a generally horizontal position. A label end 560 of the microscope slide can extend outwardly from the flow cell 520 such that a label 562 can be read when the cover 540 is at the illustrated closed position. The flow cell 520 can include a bottom portion 522 of the microtiter base 506 and a flap or cover 540 ("cover 540").

Figure 13:
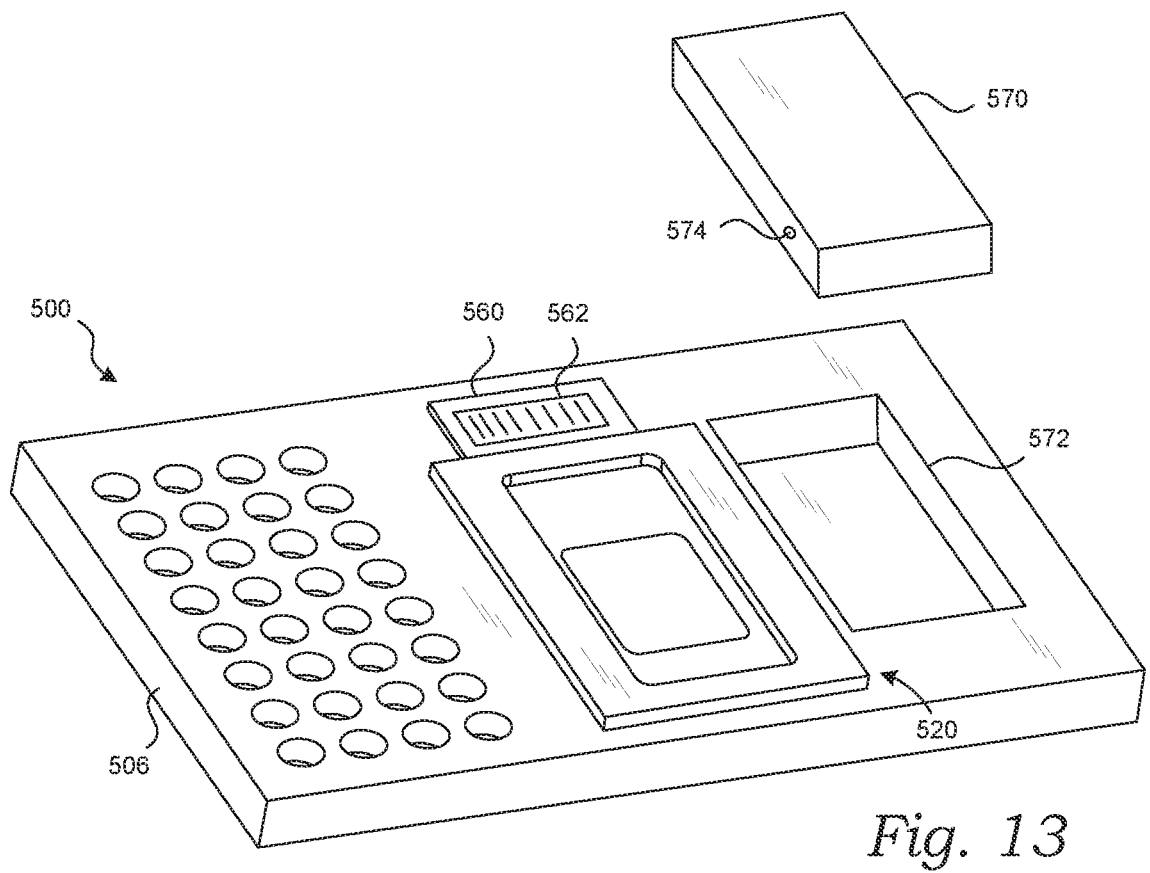
FIG. 13 is an exploded isometric view of the pipettor stainer unit of FIG. 12.

FIG. 13 is an exploded isometric view of the processing module 500 with a removable waste container 570 receivable within a waste container receptacle 572 of the microtiter base 506. The waste container 570 can include a waste receiving port 574 that is in fluid communication with the flow cell 520 when the waste container 570 is installed. The waste container 570 can also include, without limitation, one or more sealing members, valves, sensors (e.g., pressure sensors, temperature sensors, etc.), or the like. For example, the receiving port 574 can include a one-way valve that allows waste reagent to flow into the waste container 570. In some embodiments, the holding capacity of the waste container 570 is equal to or greater than the total volume of reagents used to process the specimen. As such, the single waste container 570 can hold all of the waste reagents generated in a single staining process. In other embodiments, multiple waste containers 570 can be utilized to sequentially collect reagents used in a single staining protocol.

Figure 14:
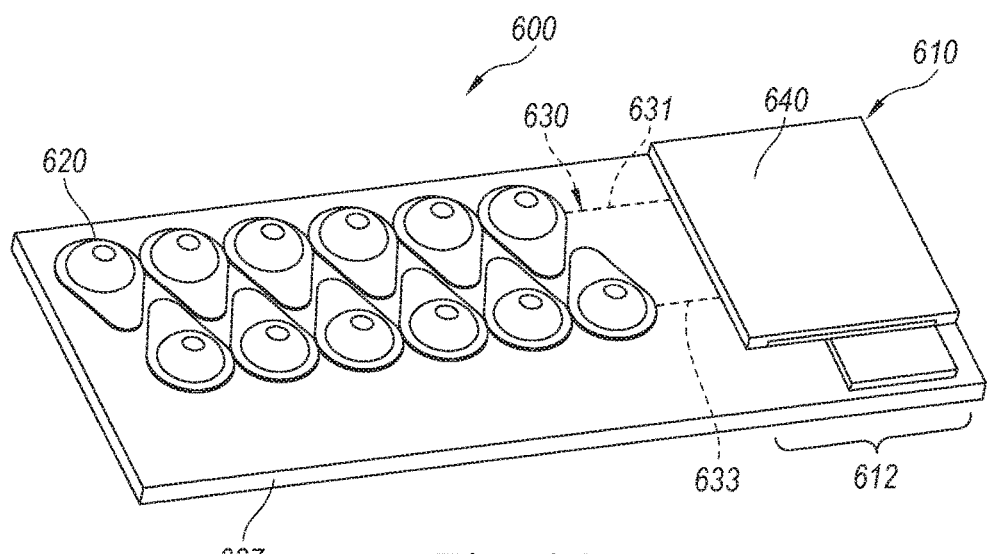
FIG. 14 is an isometric view of a stainer unit with reagent dispensing blister elements in accordance with an embodiment of the disclosed technology.
Figure 15:
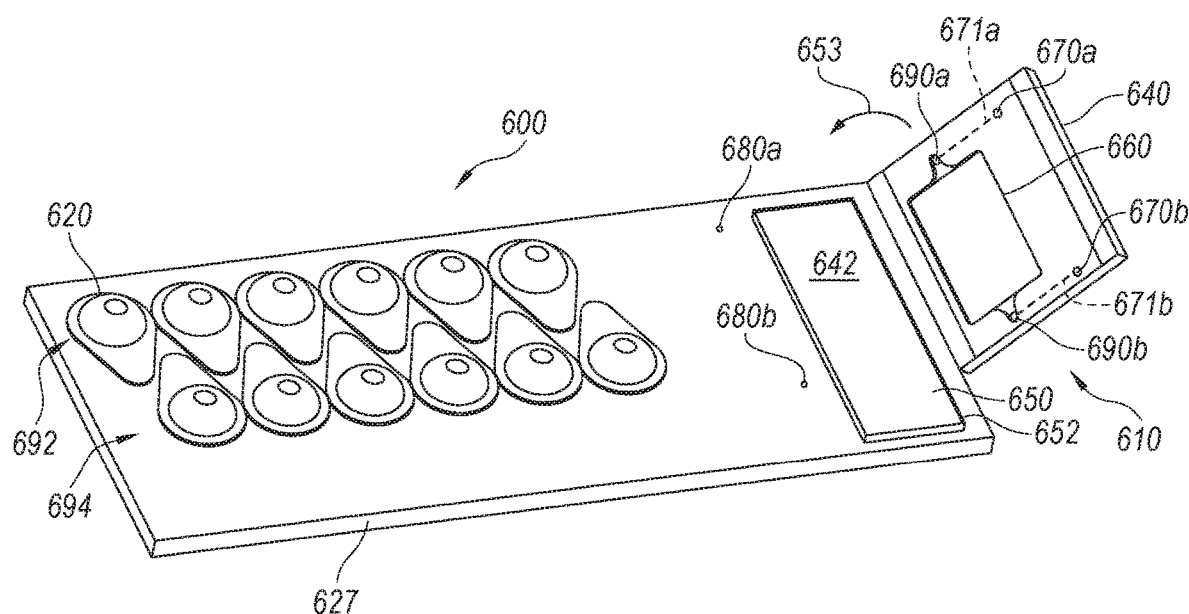
FIG. 15 is an isometric view of the stainer unit of FIG. 14 with a flow cell in an open configuration.

FIGS. 14 and 15 are isometric views of a microfluidic slide processing module 600 ("processing module 600") in accordance with an embodiment of the disclosed technology. The processing module 600 can include a flow cell 610, dispensers 620 (one identified), and a base 627 with a fluid circuit 630 (illustrated in phantom line) that fluidly connects (e.g., indirectly or directly) each of the dispensers 620 to the flow cell 610. The fluid circuit 630 can include, without limitation, one or more fluid passageways, channels (e.g., micro-channels), conduits, valves, air-trap features, pressure regulators, or the like. The dispensers 620 can be reagent-dispensing blister elements capable of dispensing predetermined reagent volumes and pushing the reagent through the fluid circuit 630 and ultimately into the flow cell 610. In automated embodiments, an end effector can have a pusher that depresses the blister elements, and in manual embodiments, a user can manually depress the blister elements to dispense.

Referring now to FIG. 15, the flow cell 610 has a cover 640 that can sealingly contact a specimen-bearing surface 642 of a microscope slide 650 at a slide-receiving region 652. The cover 640 can be rotated, as indicated by arrow 653, to move a sealing member 660 against the specimen-bearing surface 642. The cover 640 can establish fluid communication between the dispensers 620 and the reaction chamber. In some embodiments, when the cover 640 is at a closed position (shown in FIG. 14), cover inlet ports 670a, 670b of FIG. 15 (collectively "cover inlet ports 670") can mate with respective base outlet ports 680a, 680b of FIG. 15 (collectively "base outlet ports 680"). The cover inlet port 670a can be fluidly coupled, via a passageway 671a, to the reaction chamber inlet port 690a, and the inlet port 670b can be fluidly coupled, via a passageway 671b, to a reaction chamber inlet port 690b. Reagents can be introduced at opposite ends of the reagent chamber, and one or both reaction chamber inlet ports 690a, 690b can include valves to prevent or inhibit backflow. An exit port for reagent egress can be located along the wall of the slide-receiving region 652.

In other embodiments, the flow cell 610 has a single reaction chamber inlet 690. The cover 640 can include, without limitation, one or more sealing members (e.g., O-rings) or gaskets that can inhibit or prevent reagent leaking between the cover 640 and the base 627. For example, O-rings can be integrated into the ports, such as the cover inlet ports 670 or base outlet ports 680. In some embodiments, the base outlet port 680a can be in fluid communication with dispensers 620 arranged in a row 692, and the base outlet port 680b can be in fluid communication with dispensers 620 in a row 694. The dispensers 620 in the row 692 are interleaved with the dispensers 620 in the row 694 to provide a relative small footprint. The number and dispenser arrangements can be selected based on the desired footprint. The base 627 carries the dispensers 620 and can have a waste collection container in fluid communication with the reaction chamber within the flow cell 610. The number, positions, and fluidic connections between the components can be selected based on the desired flow of reagent into and through the reaction chamber.

Figure 16:
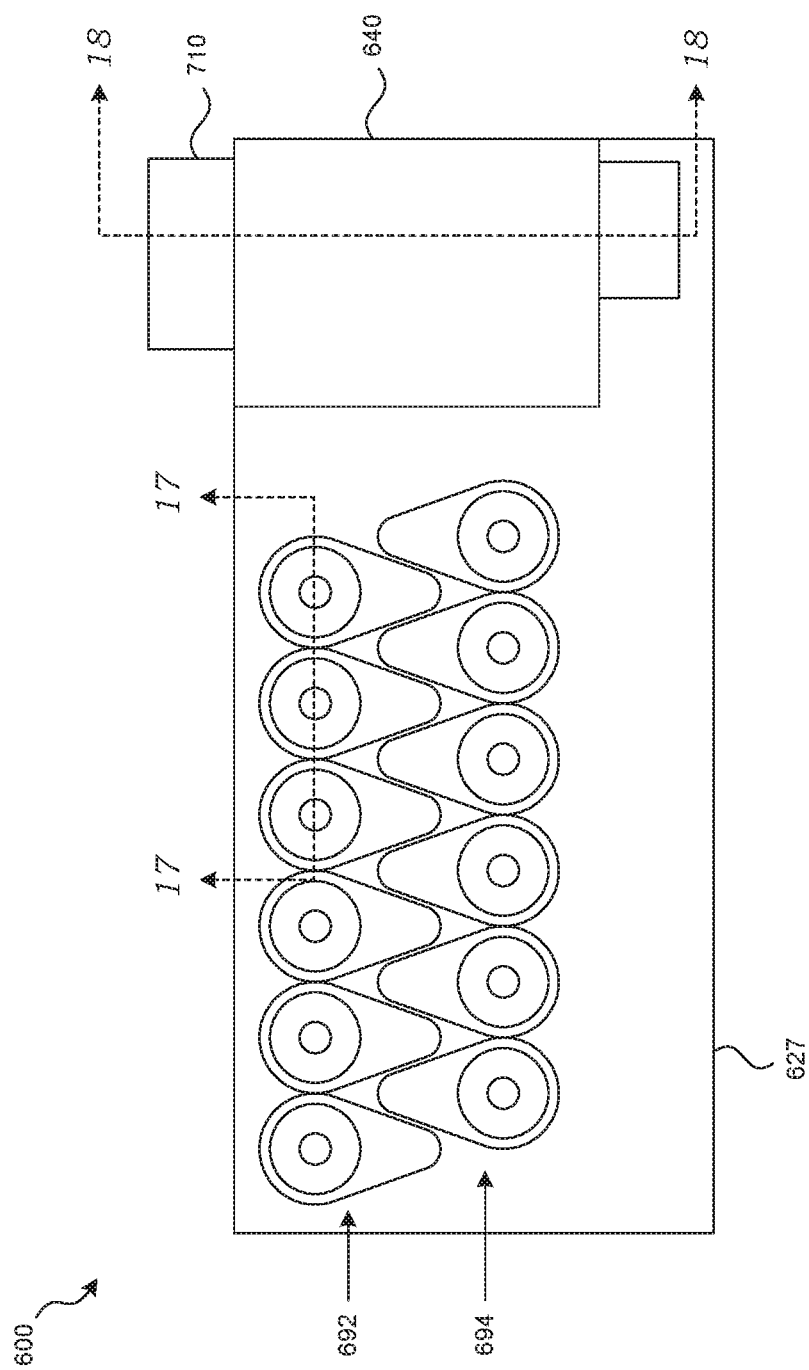
FIG. 16 is a top view of the stainer unit of FIG. 14.
Figure 17:
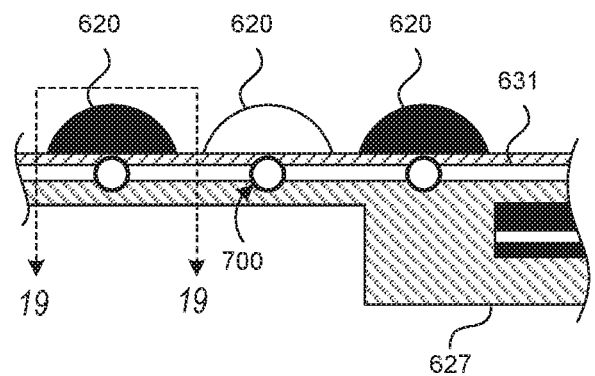
FIG. 17 is a detailed cross-sectional view of the stainer unit taken along line 17-17 of FIG. 16.

FIG. 16 is a top view of the processing module 600 with a waste container 710. FIG. 17 is a cross-sectional view of the processing module 600 taken along line 17-17 of FIG. 16. Valves 700 (one identified in FIG. 17) can be positioned along the passageway 631 to allow reagent to flow toward the flow cell and inhibit or prevent backflow of fluid (e.g., reagent or air) into an emptied dispenser 620. In some embodiments, valves can be incorporated into the dispensers 620 to simplify the fluid circuit within the base 627.

Figure 18:
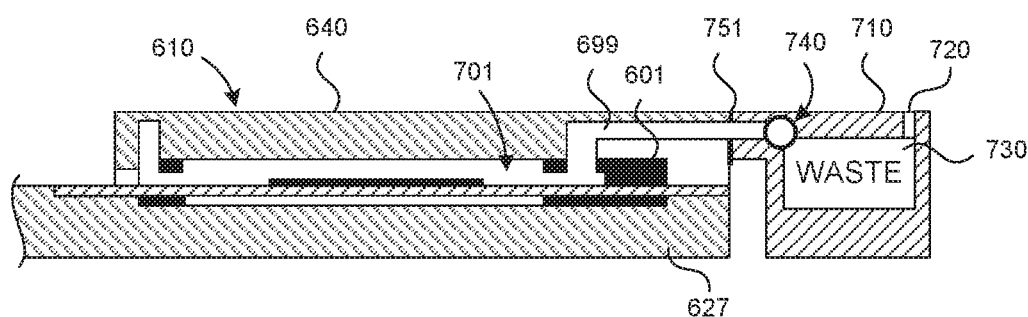
FIG. 18 is a detailed cross-sectional view of the stainer unit taken along line 18-18 of FIG. 16.

FIG. 18 is a cross-sectional view of the processing module 600 taken along line 18-18 of FIG. 16. The cover 640 can include a waste passageway 699 extending from the reaction chamber 701 to the waste container 710. The waste container 710 can include a waste chamber 730, a valve 740, and an air-escape valve 720. The valve 740 can be a one-way valve (e.g., a check valve, a duckbill valve, etc.) that allows waste to flow into the chamber 730. The air-escape valve 720 allows air to escape from the waste chamber 730 to limit the backpressure. In some embodiments, a connection 751 detachably couples the waste container 710 to the base 627 and can be a threaded connection, a breakaway connection, or the like.

Figure 19:
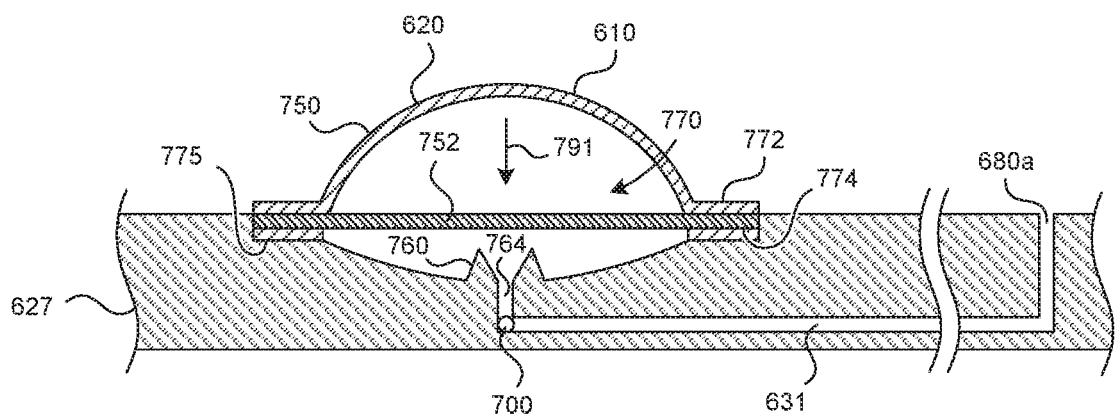
FIG. 19 is a cross-sectional view of a blister element of FIG. 17 in accordance with an embodiment of the disclosed technology.

FIG. 19 is a detailed cross-sectional view of the actuator 620 of FIG. 17. The actuator 620 can be a reagent-filled blister element having a blister 750, a pierceable or frangible element 752, and one or more piercing members 760. The blister 750 can be made, in whole or in part, of metal, plastic, or another suitable material for defining a fluid reservoir 770. One or more adhesives can couple together a periphery 772 of the blister 750 and a periphery 774 of the element 752. The periphery 774 can be coupled to the base 627 by one or more adhesives 775. When the blister 750 is moved downwardly, as indicated by arrow 791, the element 752 can be moved into contact with the piercing members 760 such that the piercing members 760 penetrate the element 752, thereby releasing the reagent. In some embodiments, the piercing members 760 can be positioned on opposite sides of an inlet 764 of the fluid passageway 631 to form openings in the element 752 near the inlet 764.

Figure 20:
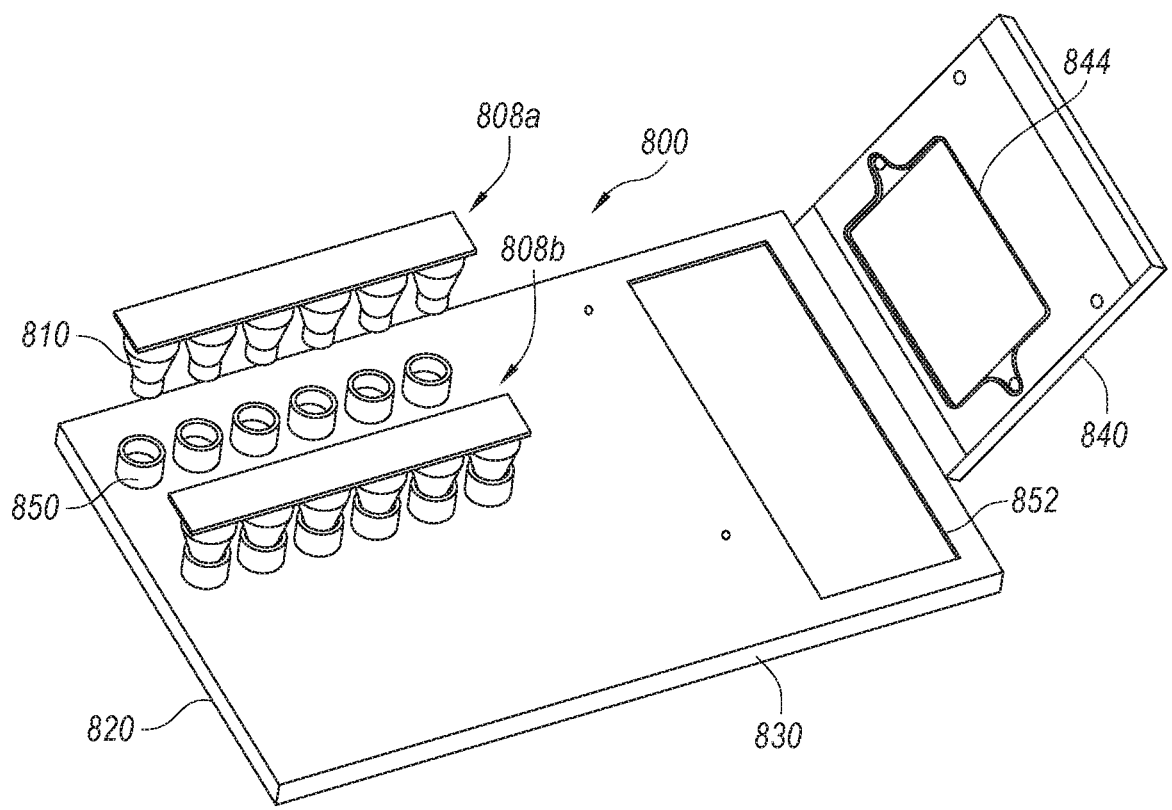
FIG. 20 is an isometric view of a stainer unit and reagent strips in accordance with an embodiment of the disclosed technology.

FIG. 20 is an isometric view of a microfluidic slide processing module 800 in accordance with an embodiment of the disclosed technology. The processing module 800 can include multiple strips 808a, 808b (collectively "strips 808") of reagent elements 810 (one identified) that can be fluidly coupled to a base unit 820. The base unit 820 can include a platform or base 830 and a cover 840 that cooperate to form a flow cell. The description of the flow cells discussed in connection with FIGS. 14-18 applies equally to the flow cell of FIG. 20.

The cover 840 is movable between the illustrated open position for placing a microscope slide at a slide-receiving region 852 and a closed position for contacting a slide at the slide-receiving region 852. For example, a gasket 844 can sealingly engaging a specimen-bearing slide surface to define a reaction chamber between the cover and the slide. The illustrated embodiment includes two strips 808a, 808b, each with six interconnected reagent elements positioned to be inserted into a respective feed ports 850. The number of strips, configuration of the strips, and number of reagent elements per strip can be selected based on the number of reagents for the staining protocol.

Figure 21:
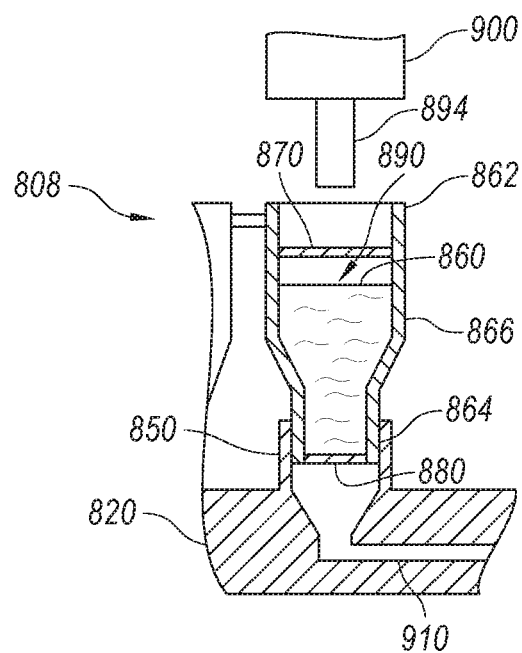
FIG. 21 is a cross-sectional view of a reagent element and feed port of the stainer unit of FIG. 20.

FIG. 21 is a cross-sectional view of one of the reagent elements 810 and feed ports 850. The reagent element 810 defines a reservoir 890 and includes an upper end 862, a lower end 864, and a main body 866. The upper end 862 can include a sealing member or cover 870 ("cover 870") that can be pierced by a nozzle 894 of a pressurization device 900. The pressurization device 900 can output pressurized fluid to break the cover 870 to release reagent 860 such that the released reagent 860 flows along a passageway 910 in the base unit 820. The pressurization device 900 can be part of an end effector (e.g., end effector 162 of FIG. 2) of an automated system.

Figure 22:
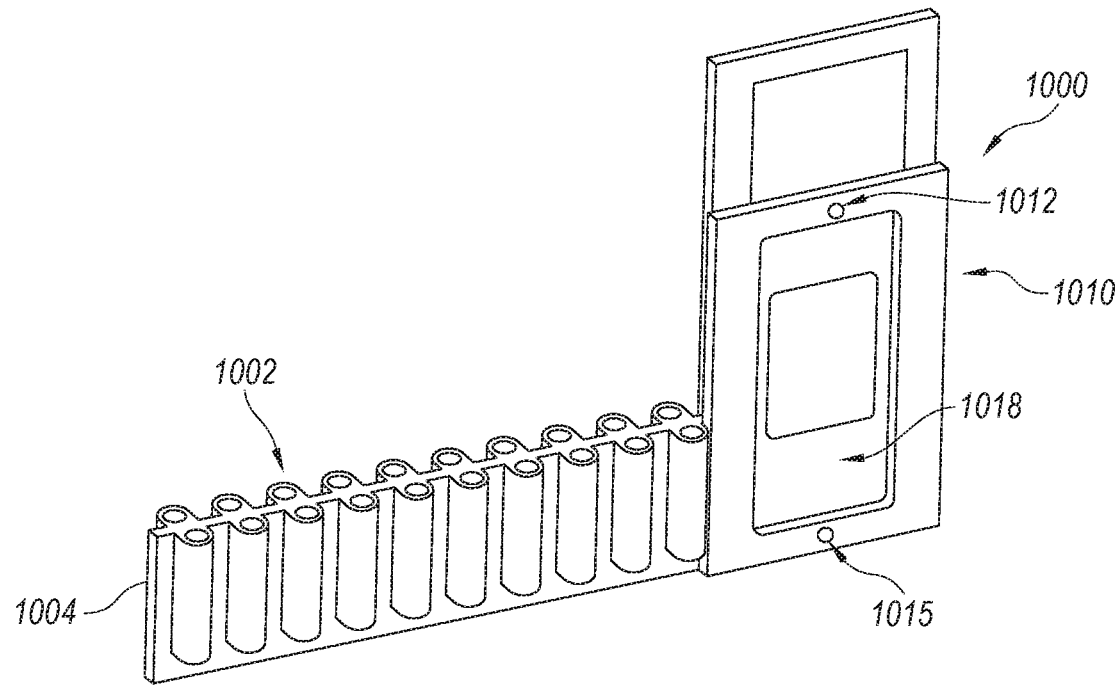
FIG. 22 is an isometric view of a stainer unit suitable for use with pipettors in accordance with an embodiment of the disclosed technology.

FIG. 22 is an isometric view of a microfluidic slide processing module 1000 ("processing module 1000") in accordance with an embodiment of the disclosed technology. The processing module 1000 can include reagent elements 1002 (one identified), a connector or base 1004 ("base 1004"), and a flow cell 1010. The base 1004 connects the reagent elements 1002 to the flow cell 1010. The flow cell 1010 has an input or feed port 1012 ("input port 1012") for receiving fresh reagent and a waste port 1015 for outputting used reagent. A pipette can carry reagent from the reagent reservoirs 1002 and can be mated with the input port 1012. For example, a loaded pipette can be at a non-vertical orientation, such as a generally horizontal position (i.e., a longitudinal axis of a pipette can be generally horizontal), for mating with the input port 1012.

The vertical orientations of the reagent elements 1002 allow a pipette to be inserted into the reagent reservoirs. The flow cell 1010 can hold the microscope slide at a substantially vertical orientation such that gravity facilitates the flow of reagent downwardly through the reaction chamber. The term "substantially vertical" generally refers to an angle within about ±5 degrees of the vertical, for example, within about ±3 degrees of vertical, such as within about ±1 degree of vertical. The vertical orientation can also help drain reagent from the flow cell 1010.

Figure 23:
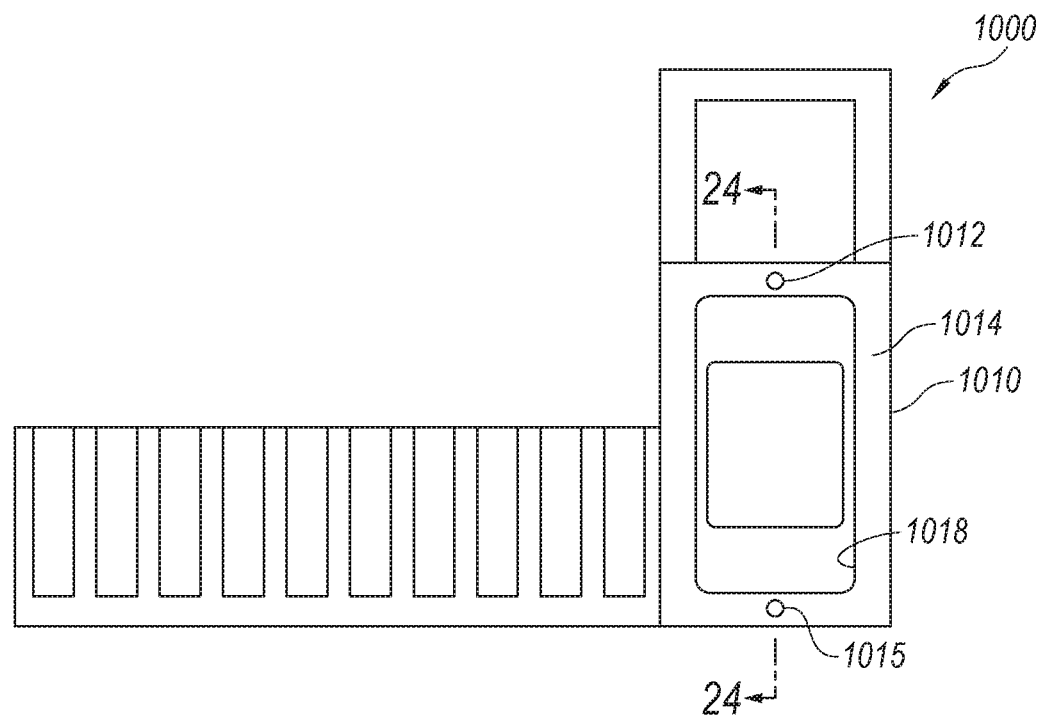
FIG. 23 is a front view of the stainer unit of FIG. 22.

FIG. 23 shows the flow cell 1010 including a cover 1014 that defines a window 1018 for viewing the specimen without performing an additional coverslipping operation. In other embodiments, the cover 1014 can be opened to remove the processed microscope slide for a subsequent coverslipping process, whether manual or automated.

Figure 24:
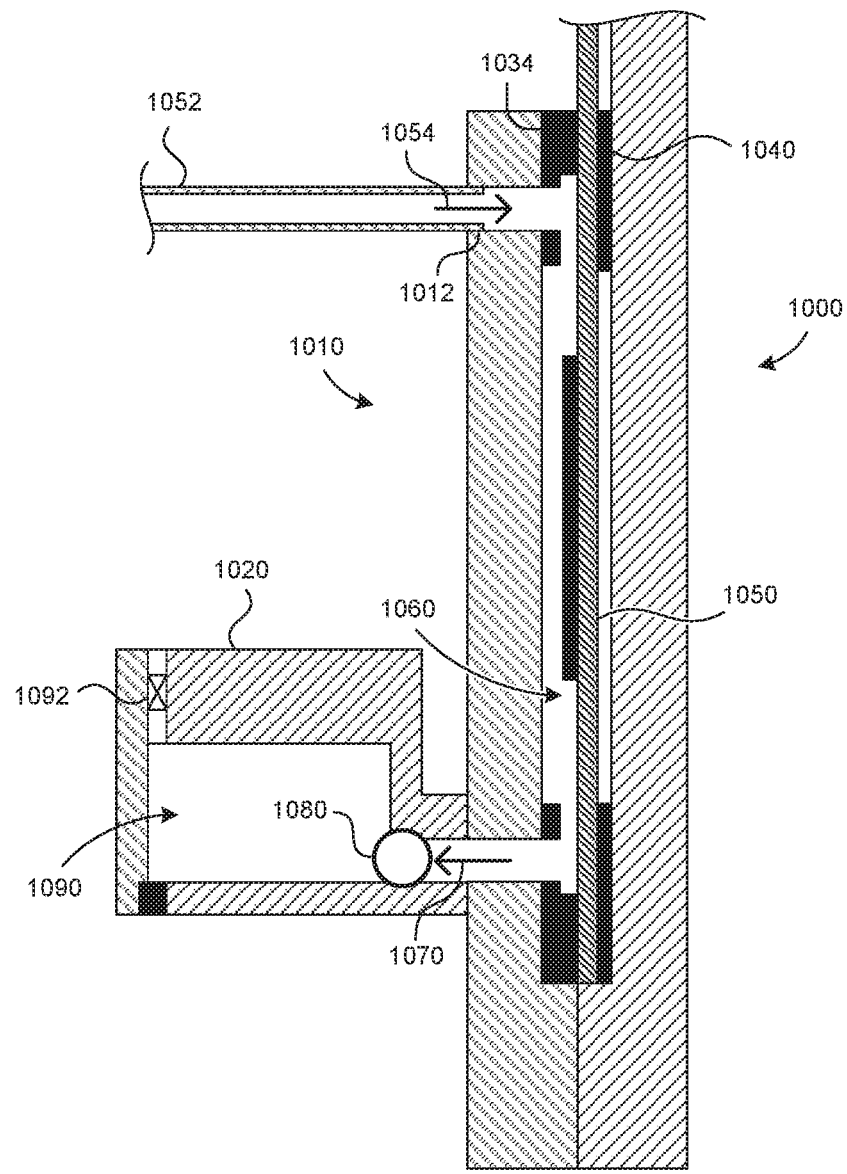
FIG. 24 is a cross-sectional view of the stainer unit taken along line 24-24 of FIG. 23.

FIG. 24 is a cross-sectional view of the processing module 1000 taken along line 24-24 of FIG. 23. FIG. 24 shows an optional waste container 1020 coupled to the flow cell 1010. (The waste container 1020 is not shown in FIGS. 22 and 23.) The flow cell 1010 can include sealing gaskets 1034, 1040 positioned to contact opposing surfaces of the microscope slide 1050. A pipette 1052 can deliver fresh reagent, indicated by arrow 1054, through the input port 1012. The fresh reagent can flow downwardly along a reaction chamber 1060 until the entire chamber is partially or completely filled. The previous reagent can be flushed out of the reaction chamber 1060 via the waste port 1015, as indicated by arrow 1070. Advantageously, gravity can cause the fresh reagent to flow throughout the chamber 1060 to help facilitate removal of the used reagent. The waste collector 1020 can include one or more valves 1080 through which the reagent flows before being collected in a waste reservoir 1090. The waste container 1020 can have an air release valve 1092 for allowing air to escape as the waste reservoir 1090 is filled.

Figure 25:
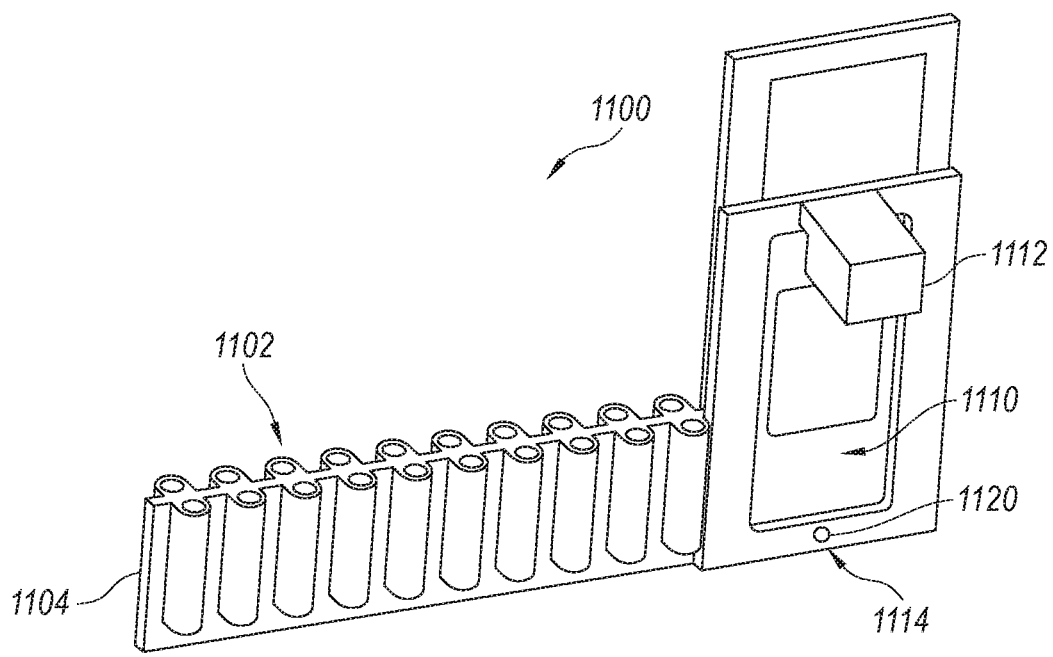
FIG. 25 is an isometric view of a stainer unit with a waste collector in accordance with an embodiment of the disclosed technology.

FIG. 25 is an isometric view of microfluidic slide processing module 1100 ("processing module 1100") in accordance with an embodiment of the disclosed technology. The description of the processing module 1000 discussed in connection with FIGS. 22-24 applies equally to the processing module 1100 unless indicated otherwise. The processing module 1100 can include reagent elements or reservoirs 1102, a connector or base 1104 ("base 1104"), and a flow cell 1110 with a waste container 1112. The waste container 1112 can be permanently or detachably coupled to a cover 1114.

Figure 26:
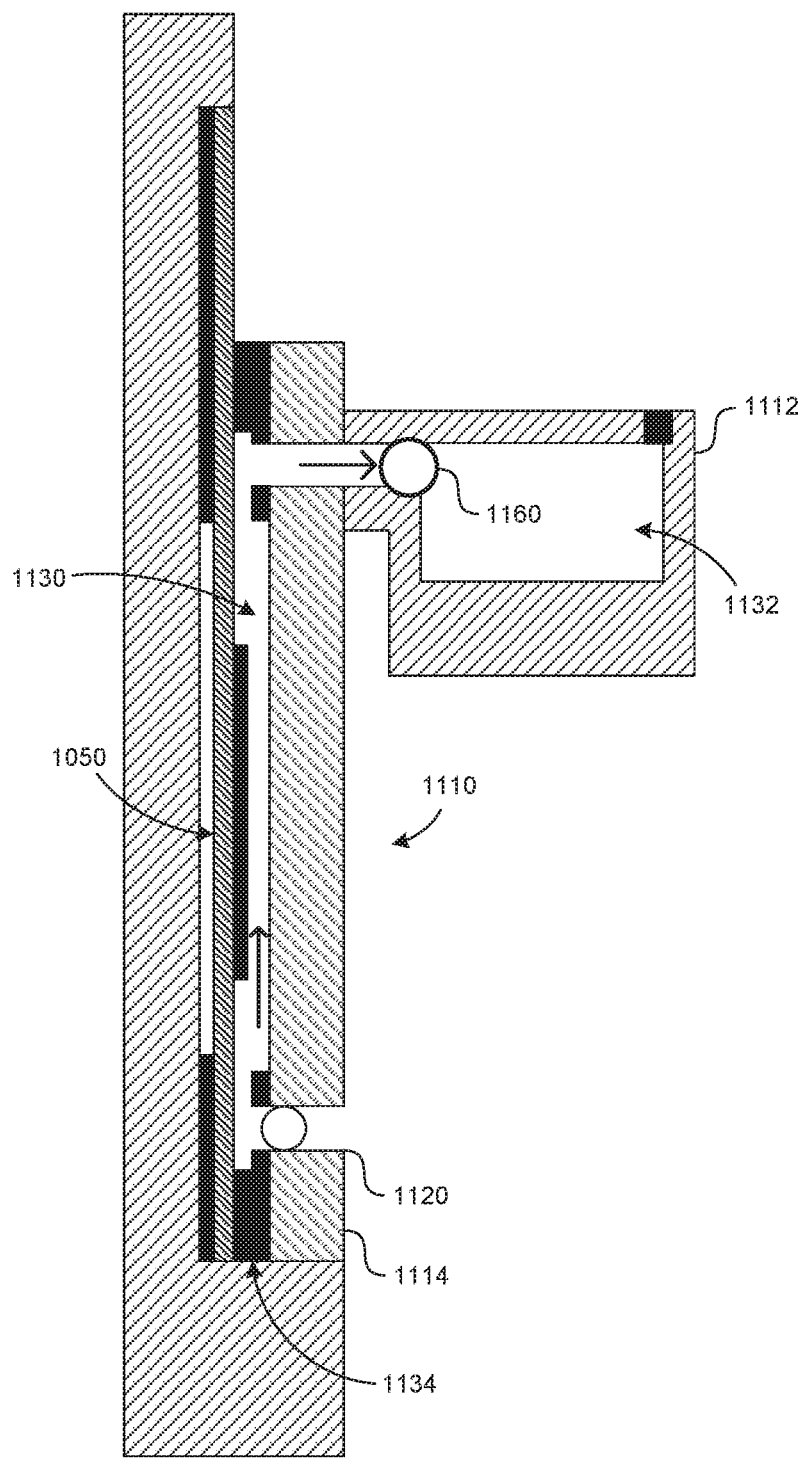
FIG. 26 is a cross-sectional view of a flow cell and waste container of FIG. 25.

FIG. 26 is a cross-sectional view of the flow cell 1110 taken along a generally vertical plane. Reagent can be delivered into the flow cell 1110 via an input or feed port 1120 of the cover 1114. The reagent can flow upwardly along the reaction chamber 1130 and ultimately into a waste chamber or reservoir 1132 of the waste container 1112. Gaskets or sealing members 1134 can sealingly engage a microscope slide 1150 to limit, prevent, or substantially eliminate leaking of reagent from the reaction chamber 1130. A valve 1160 can keep waste reagent within the waste chamber 1132 and can be part of the waste container 1112. In other embodiments, the valve 1160 can be integrated into the cover 1114.

III. Methods for Processing Specimens

Figure 27:
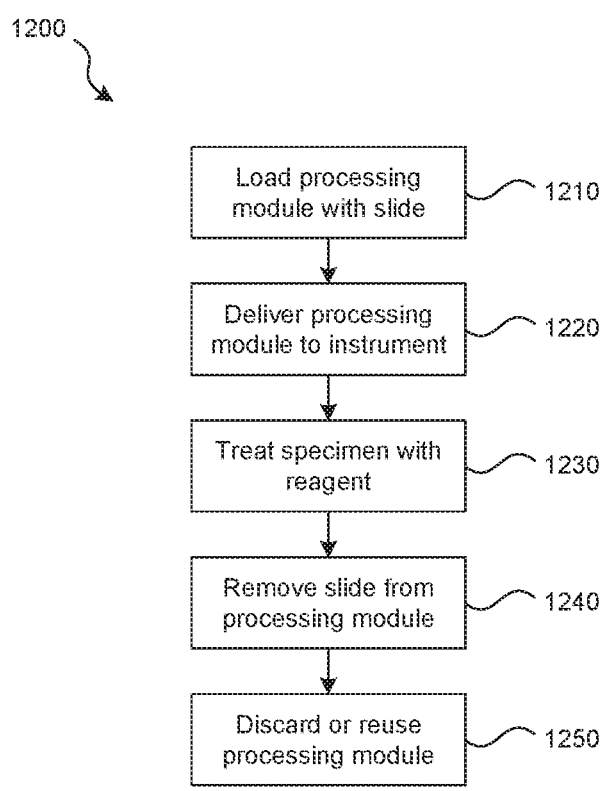
FIG. 27 is a flow chart illustrating a method for processing a specimen in accordance with an embodiment of the disclosed technology.

FIG. 27 is a flow chart illustrating a method 1200 for processing a specimen in accordance with an embodiment of the disclosed technology. In general, a stainer unit can be loaded with a specimen-bearing slide. The stainer unit can be delivered to an automated instrument, and the specimen is treated using one or more reagents carried by the stainer unit. After processing the specimen, the specimen-bearing slide can be removed from the stainer unit. Although method 1200 is primarily discussed in connection with the processing modules of FIGS. 5-11, the method can be performed using other stainer units and processing modules discussed herein. Details of the method 1200 are discussed in detail below.

At block 1210, the processing module 300 can be loaded with a microscope slide placed at the set down area 360. Specimens on the slide can have tissue that has been fixed prior to placement in the processing module 300. A dryer can help remove water and paraffin from paraffin-embedded specimens by melting and spreading the paraffin across the surfaces of the slides. The resulting thin layers of paraffin, having greater surface area once spread across the slides, may be more easily removed by deparaffinizing liquid applied to the slide. The cover 340 can be moved from the open position (FIG. 6) to a closed position (FIG. 5) such that the specimen is located in the window 324.

At block 1220, the processing module 300 can be delivered to the instrument. A user can input information into the instrument. A controller can determine a program for operating the components based, at least in part, on the inputted information. The inputted information can include, without limitation, one or more staining protocols, tissue sample information, processing times, imaging protocols, or the like. The user can also select a stored program to perform a desired protocol. If the processing module and/or slide include a label (e.g., RFID tags, transponders, or the like) that contains information that can be acquired by, e.g., readers, scanners, or other devices, and the acquired information can be sent to the controller, which in turn determine an appropriate program. Different programs can be used to perform tissue conditioning, staining, antigen retrieval, IHC, ISH, etc. The programs can be calculated, determined, or selected based on information about the slide/specimen and/or the available reagents. For example, a program can be determined based on the available reagents carried by the processing module, composition of the specimen, tissue type, or the like. If the processing module cannot be used to process the specimen, the processing instrument can notify a user that another processing module should be used.

At block 1230, the instrument can treat the specimen using reagents from the processing module. For example, the end effecter 162 (FIG. 2) can use a pipette to perform a dispensing cycle that may include mixing reagents in a mixing well within the slide processing module or a separate well. The pipettes can be standard glass or plastic pipettes, such as disposable pipette tips used with hand-held, adjustable pipettors. The holding capacity of the pipettes can be in a range of about 20 µl to about 100 µl, about 100 µl to about 200 µl, about 1 microliters to about 5 microliters, 5 microliters to about 50 microliters, about 25 microliters to about 75 microliters, but more typically, the pipettes will have a capacity in the equal to or less than about 25 µL, about 50 µL, about 100 µL, about 150 µL, or about 200 µL. In some embodiments, the pipettes can hold about 25 µL to about 100 µL, about 50 µL to about 100 µL, about 75 µL to about 120 µL or other desired volumes.

The apparatus 160 (FIG. 2) can aspirate reagents out of reservoirs and can carry the loaded pipette to the input port 350 (FIG. 5). The apparatus 160 can create positive pressure that causes the reagent to flow from the pipette into the input port 350. As discussed in connection with FIGS. 9-10, the reagent can flow into the flow cell and to fill the reaction chamber 380 (FIG. 10). The closed flow cell can prevent evaporative losses to avoid using excessive amounts of reagent. The reagent can be replenished with fresh reagent any number of times to achieve desired staining. For example, the controller 130 (FIG. 1) can instruct the dispenser apparatus 160 to provide supplemental reagent at a desired rate (e.g., a fixed rate or a variable rate) based on the degradation or oxidation rates of the liquid.

In some protocols, a series of liquids can include, for example, a deparaffinizing liquid, a conditioning liquid, a staining reagent, a stain-differentiating reagent, a stain-setting reagent, a counterstaining reagent, a washing liquid, and a coverslipping liquid. During deparaffinizing, a paraffin composition in which the specimen is embedded can be at least partially removed to prepare the specimen for further processing. The system 201 of FIG. 4 can process slides in parallel. In at least some cases, deparaffinizing includes iterations (e.g., 4, 5, 6, 7, 8, or another suitable number of iterations) of dispensing a deparaffinizing liquid onto slides respectively carrying the specimens, allowing the dispensed deparaffinizing liquid to remain in contact with a paraffin composition in which the specimens are embedded for a suitable period of time so as to solubilize a portion of the paraffin composition, and then removing the dispensed deparaffinizing liquid along with a solubilized portion of the paraffin composition.

After deparaffinizing and conditioning, staining, antigen retrieval, IHC, ISH, or other processes can be performed on the conditioned specimen. Optional washing can include iterations (e.g., 2, 3, or another suitable number of iterations) of dispensing a washing liquid onto a slide, allowing the dispensed washing liquid to remain in contact with the specimen for a suitable period of time so as to wholly or incrementally wash the specimens (e.g., while the washing liquid is in the form of a puddle having a shape maintained at least partially by surface tension), and then removing the dispensed washing liquid. The washing liquid can flush out the deparaffinizing and solutions. The time during which the dispensed washing liquid is in contact with the specimen can be, for example, a time within a range from 5 seconds to 45 seconds, from 20 seconds to 1 minute, or the like. Pure deionized water can be used as a washing liquid. Alternatively, washing liquids can include deionized water along with a solvent. When used in temperature-controlled flow cells configured in accordance with at least some embodiments of the present technology, incubation temperatures can be used alone or in conjunction with incubation time to control processing.

The seal 370 (FIG. 8) can be a fluid-tight seal that prevents leaking of reagent and can be maintained when the pressure within the chamber 380 is at or above a pressure of about 1 bar, 1.5 bar, 2 bar, 2.5 bar, 3 bar, 3.5 bar, or 4 bar, atmospheric pressure, or other desired pressure suitable for pressurized staining. For example, a reagent within the chamber 380 can be at a pressure in a range of about 1 bar to about 4 bar, about 1.5 bar to about 3.5 bar, or the like. The pressurized reagent can be heated to temperatures higher than the normal boiling temperature of reagent (e.g., when the reagent is at atmospheric pressure) to provide enhanced antigen retrieval. The chamber 380 can kept at a high enough pressure to inhibit or prevent boiling of the reagent when the reagent (e.g., a reagent comprising primarily water) is at a temperature equal to or higher than about 80° C. (e.g., taking into account higher altitude conditions), 90° C., 100° C., or 105° C. For example, the chamber 380 can be sealed by closing the valves 353, 355, and the seal 370, as well as any other seals of the flow cell, can be selected to increase the boiling points of reagents or buffers at least about 5%, 10%, 15%, 20%, or 25%. Enhanced staining can be achieved in very short times with such an arrangement. A clamping device or a user's hand can press the cover 340 against the slide 362 with sufficient force to maintain the fluid-tight seal 370. In some embodiments, the seal 370 prevents surrounding air from entering the chamber 380 to limit or reduce degradation of the reagent. The configuration, mechanical properties (e.g., compressibility), and composition of the sealing gasket 341 can be selected based on, for example, desired sealing capabilities, reaction chamber dimensions, or the like.

The specimen can be dehydrated and a coverslip can be applied. Coverslipping liquids can be applied directly to the microscope slide after opening the cover. A coverslipping liquid selected or formulated in accordance with a particular embodiment of the present technology includes about 100% d-limonene with a suitable preservative, such as 500 parts per million butylated hydroxytoluene. After applying the coverslipping liquid, the system can then apply coverslips. For example, an automated coverslipper can apply solvent to the slides and can place coverslips with pre-applied adhesive onto the slides.

At block 1240 of FIG. 27, the processing module can be removed from staining instrument and opened to remove the processed slide. The specimen can be microscopically analyzed. The waste materials (e.g., reacted reagent) can be contained in a waste container of the processing module throughout slide removal and disposal. In some procedures, coverslipping is performed after removing the slide from the processing module.

At block 1250, the processing module itself or its disposable components can be discarded. As used herein, the term "disposable" when applied to a system or component (or combination of components), such as a stainer unit or processing module, is a broad term and means, without limitation, that the component in question is used a finite number of times and then discarded. Some disposable components are used only once and then discarded. Other disposable components are used more than once and then discarded. For example, a disposable waste container can be used to collect waste generated by a single assay and is then discarded whereas a base of a module can be used multiple times.

Although various operations are presented in a sequence(s), it should be understood that the various operations discussed in connection with method 1200 may be performed in orders other than those that are illustrated, or may be performed concurrently. Examples of such alternate orderings includes interrupted, reordered, supplemental, simultaneous, reverse, or other variant orderings, unless context dictates otherwise. For example, the specimens can be pretreated, either manually or robotically, with conditioners prior to delivery to the instrument at block 1220. The method 1200 can be performed with the stainer units of FIGS. 12-26.

The various embodiments described above can be combined to provide further embodiments. The embodiments, features, systems, devices, materials, methods, and techniques described herein may, in some embodiments, be similar to any one or more of the embodiments, features, systems, devices, reagents, processing steps, materials, methods, and techniques described in U.S. patent application Ser. No. 11/187,183; U.S. patent application Ser. No. 13/509,785; U.S. patent application Ser. No. 13/509,785; U.S. patent application Ser. No. 13/157,231; U.S. Pat. Nos. 7,468,161; 9,618,430; and 8,790,596; PCT Application No. PCT/EP2019/068774; U.S. Provisional Application No. 62/698,786; and International App. No. PCT/US2010/056752, all of which are incorporated by reference in their entireties. In addition, the embodiments, features, systems, devices, materials, methods, and techniques described herein may, in certain embodiments, be applied to or used in connection with any one or more of the embodiments, features, systems, devices, materials, methods, and techniques disclosed in the above-mentioned U.S. patent application Ser. No. 11/187,183; U.S. patent application Ser. No. 13/509,785; U.S. patent application Ser. No. 13/509,785; U.S. patent application Ser. No. 13/157,231; U.S. Pat. Nos. 7,468,161; 9,618,430; and 8,790,596; and International App. No. PCT/US2010/056752. In one embodiment, a coverslipper as substantially as described in U.S. Patent Application Publication No. 2004/0092024A1 or U.S. Pat. No. 7,468,161, which are incorporated by reference herein in their entireties, can be integrated the systems disclosed herein. The coverslippers described in U.S. Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput. Aspects of the disclosed embodiments can be modified, if necessary, to employ concepts of the various patents, applications, and publications to provide yet further embodiments. All applications listed above are incorporated herein by reference in their entireties.

The invention has been described herein for purposes of illustration, but well-known structures and functions have not been shown or described in detail to avoid unnecessarily obscuring the description of at least some embodiments of the invention. The systems, apparatuses, and components described herein can perform a wide range of processes for preparing biological specimens for analysis. The scheduling and methods disclosed herein can be used with different types of specimen processing systems with apparatuses configured to deliver liquid onto stationary slides, slides that are moved periodically or continuously throughout processing, or the like. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list. The singular forms "a," "an," and "the" include plural referents unless the context clearly indicates otherwise. Thus, for example, reference to "a specimen" refers to one or more specimens, such as two or more specimens, three or more specimens, or four or more specimens.

The embodiments, features, systems, devices, materials, methods, and techniques described herein may, in certain embodiments, be applied to or used in connection with any one or more of the embodiments, features, systems, devices, materials, methods, and techniques disclosed in the above-mentioned patents and applications. Aspects of the disclosed embodiments can be modified, if necessary, to employ concepts of the various above-mentioned patents, applications, and publications to provide yet further embodiments.

We claim:

1. An automated staining system, comprising:
a consumable microfluidic slide processing module configured to be installed in a staining instrument and including:
a plurality of individually-actuatable reagent elements, wherein at least one of the individually-actuatable reagent elements includes
a reagent reservoir holding a reagent,
a pierceable element, and
a piercing member positioned to pierce the pierceable element to release the reagent from the reagent reservoir when the at least one of the individually-actuatable reagent elements is depressed to move the pierceable element toward and against the piercing member;
a plurality of one-way flow valves fluidly connected to and positioned in series along a fluid line such that all but one of the plurality of individually-actuatable reagent elements is positioned downstream of one or more of the plurality of one-way flow valves, wherein the plurality of one-way flow valves are positioned downstream of and spaced apart from the piercing member such that the released reagent flows sequentially past the piercing member and through the plurality of one-way flow valves via the fluid line, and wherein at least one of the plurality of one-way flow valves is configured to prevent backflow of the released reagent towards the pierceable element and into the emptied reagent reservoir, and backflow of reagent released from one or more individually-actuatable reagent elements located downstream of the at least one of the plurality of one-way flow valves;

a flow cell connected to the plurality of individually-actuatable reagent elements by the fluid line and including:

a slide-receiving region dimensioned to receive a microscope slide, and a cover having a gasket positioned to sealingly contact a specimen-bearing surface of the microscope slide to define a reaction chamber that is between the cover and the specimen-bearing surface and surrounded by the gasket, and wherein when the consumable microfluidic slide processing module is installed in the staining instrument, the staining instrument is operable to cause the released reagent to flow through the plurality of one-way flow valves and be delivered to the reaction chamber; and one or more valves configured to allow the released reagent to be delivered into the reaction chamber and to be closed to inhibit the reagent from flowing out of the reaction chamber to increase a boiling point of the reagent within the reaction chamber.

2. The automated staining system of claim 1, further comprising a staining instrument including a loading station configured to receive the consumable microfluidic slide processing module, and at least one end effector operable to cause reagent to be delivered from each of the reagent reservoirs to the reaction chamber.

3. The automated staining system of claim 1, further comprising a staining instrument including a controller programmed to receive information from the microscope slide or a user; and process a tissue specimen in the reaction chamber in response to the received information.

4. The automated staining system of claim 1, wherein the reaction chamber is pressurizable to raise the boiling point of the reagent within the reaction chamber for high temperature target retrieval.

5. The automated staining system of claim 1, wherein the reaction chamber is configured to maintain a fluid-tight seal between the gasket and the specimen-bearing surface of the microscope slide such that the boiling point of the reagent is raised by at least about 10%.

6. The automated staining system of claim 1, further comprising a staining instrument configured to use the microfluidic slide processing module to perform a staining protocol without directly contacting the reagents that are delivered to the reaction chamber.

7. The automated staining system of claim 1, wherein the flow cell is configured to hold the microscope slide in a substantially vertical orientation such that reagent flows vertically through the reaction chamber while the reagent elements are in a substantially vertical orientation and hold reagents.

8. The automated staining system of claim 7, wherein the flow cell has an input port in fluid communication with the reaction chamber, wherein the input port is positioned at an upper end of the reaction chamber.

9. The automated staining system of claim 1, further comprising:

a pipette mateable with an input port of the flow cell for dispensing reagent through the input port and into the reaction chamber.

10. The automated staining system of claim 1, wherein the reagent elements include one or more pipettes, reagent-dispensing blister elements, and/or reagent strips with pressurizable reagent reservoirs for driving reagent into the flow cell.

11. The automated staining system of claim 1, wherein the consumable microfluidic slide processing module includes a waste reservoir, and a fluid circuit that fluidly couples each of the reagent elements to the reaction chamber and fluidly couples the reaction chamber to the waste reservoir.

12. The automated staining system of claim 1, wherein the consumable microfluidic slide processing module includes a waste reservoir in fluid communication with the reaction chamber such that the waste reservoir receives waste reagents that have passed through the reaction chamber.

13. The automated staining system of claim 1, wherein the microfluidic slide processing module is a single-use disposable module.

14. The automated staining system of claim 1, wherein the reagent reservoir is mateable with at least a portion of a pipette to establish fluid communication between a chamber of the reagent reservoir and the pipette.

15. The automated staining system of claim 1, wherein the microfluidic slide processing module further comprises a plate carrying the reagent elements and including one or more micro-channels extending from the reagent elements to the flow cell, wherein one or more of the reagent elements are reagent-dispensing actuatable elements.

16. The automated staining system of claim 1, wherein the reagent elements are spaced apart from one another to receive respective reagent reservoirs of a reagent strip.

17. The automated staining system of claim 1, wherein the cover is movable between an open position for placing the microscope slide at the slide-receiving region and a closed position for sealingly contacting the specimen-bearing surface, wherein the cover is in fluid communication with one or more of the reagent elements when in the closed position.

18. The automated staining system of claim 1, wherein the cover includes an optically transparent element positioned to cover a tissue specimen located in the reaction chamber.

19. The automated staining system of claim 1, wherein the cover includes a coverslip positioned to overlay the specimen-bearing surface of the microscope slide.

20. The automated staining system of claim 1, further comprising:

a waste container in fluid communication with the reaction chamber to receive waste reagents that have passed through the reaction chamber.

21. The automated staining system of claim 20, wherein the waste container is configured to hold the waste reagents after the consumable microfluidic slide processing module has been removed from the staining instrument.

22. The automated staining system of claim 20, wherein the waste container is detachably coupled to a base carrying the reagent elements and the flow cell.

23. A microfluidic slide processing module, comprising:

a plurality of reagent elements, each including a blister, a chamber holding a reagent, a pierceable element, and a piercing member positioned outside of the chamber and configured to pierce the pierceable element to release the reagent from the chamber when the blister is actuated to move the pierceable element through the piercing member;

a plurality of one-way flow valves fluidly connected in series by a single fluid line, and wherein each of the plurality of one-way flow valves is configured to
- allow a released reagent from one of the chambers positioned upstream of the one-way flow valve to flow therethrough, and
- prevent backflow of a released reagent from one of the chambers positioned downstream of the one-way flow valve back along the single fluid line into one of the chambers positioned upstream of the one-way flow valve;

a flow cell connected to the plurality of reagent elements by the single fluid line, the flow cell including:
- a slide-receiving region dimensioned to receive a microscope slide, and
- a cover having a gasket that contacts a specimen-bearing surface of the microscope slide to define a reaction chamber between the cover and the specimen-bearing surface, wherein the flow cell is configured to receive reagent from each one of the reagent elements and to deliver the received reagent to the reaction chamber; and one or more valves in fluid communication with the reaction chamber and configured to allow the reagent to be delivered into the reaction chamber and to be closed to inhibit fluid from flowing out of the reaction chamber to increase a boiling point of the reagent within the reaction chamber.

24. The microfluidic slide processing module of claim 23, wherein the microfluidic slide processing module is a single-use consumable device.

25. The microfluidic slide processing module of claim 23, further comprising a waste container in fluid communication with the reaction chamber, the waste container having a closed reagent chamber that contains waste reagents that have passed through the reaction chamber.

26. The microfluidic slide processing module of claim 23, wherein the cover is movable between an open position for placing the microscope slide at the slide-receiving region and a closed position for sealingly contacting the specimen-bearing surface, wherein the cover provides fluid communication between one or more of the reagent elements and the reaction chamber when in the closed position.

27. The microfluidic slide processing module of claim 23, further comprising:
a platform carrying the reagent elements and including one or more micro-channels extending from the reagent elements to the flow cell.

28. The microfluidic slide processing module of claim 23, further comprising:
a waste reservoir in fluid communication with the reaction chamber to receive and contain waste reagents that have passed through the reaction chamber.

29. A microfluidic slide processing module, comprising:
a plurality of reagent elements positioned in series along a fluid line, each including:
- a blister,
- a chamber holding a reagent,
- a pierceable element, and
- a piercing member positioned outside of the chamber and configured to pierce the pierceable element to release the reagent from the chamber when the blister is actuated to move the pierceable element through the piercing member, and a plurality of one-way flow valves positioned in series along the fluid line, wherein the released reagent flows from each of the chambers through a different group of the plurality of one-way flow valves, wherein the plurality of one-way flow valves are configured to prevent backflow of the released reagent into the chambers; and a flow cell fluidically connected to the plurality of reagent elements by the fluid line, wherein the flow cell includes:
- a slide-receiving region dimensioned to receive a microscope slide, and
- a cover configured to contact a specimen-bearing surface of the microscope slide to define a reaction chamber between the cover and the specimen-bearing surface such that the flow cell receives reagent from each one of the reagent elements and delivers the received reagent to the reaction chamber.

30. The microfluidic slide processing module of claim 29, wherein at least one of the plurality of one-way flow valves prevents backflow of reagent released from one or more reagent elements located downstream of the at least one of the plurality one-way flow valves into at least one of the chambers located upstream of the at least one of the plurality of one-way flow valves.

* * * * *